United States Patent
Park et al.

(10) Patent No.: US 9,746,928 B2
(45) Date of Patent: Aug. 29, 2017

(54) DISPLAY DEVICE AND CONTROL METHOD THEREOF

(75) Inventors: Sung Jong Park, Seoul (KR); Kyung Jin Kim, Seoul (KR); Sae Hun Jang, Seoul (KR); Gu-Ang Jang, Seoul (KR); Sung IL Cho, Seoul (KR); Yooseok Cho, Seoul (KR); Jiyoung Hong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 24 days.

(21) Appl. No.: 14/004,642

(22) PCT Filed: Apr. 19, 2011

(86) PCT No.: PCT/KR2011/002788
§ 371 (c)(1),
(2), (4) Date: Oct. 15, 2013

(87) PCT Pub. No.: WO2012/144666
PCT Pub. Date: Oct. 26, 2012

(65) Prior Publication Data
US 2014/0028567 A1    Jan. 30, 2014

(51) Int. Cl.
G06F 3/01 (2006.01)
G06F 3/00 (2006.01)
G06F 3/023 (2006.01)
G06F 3/03 (2006.01)

(52) U.S. Cl.
CPC .............. *G06F 3/017* (2013.01); *G06F 3/005* (2013.01); *G06F 3/0236* (2013.01); *G06F 3/0304* (2013.01)

(58) Field of Classification Search
CPC ........ G06F 3/005; G06F 3/017; G06F 3/0236; G06F 3/0304
USPC .................................................. 345/156–184
See application file for complete search history.

(56) References Cited

U.S. PATENT DOCUMENTS

| | | | |
|---|---|---|---|
| 8,928,589 B2 * | 1/2015 | Bi .................................. | 345/168 |
| 2007/0063979 A1 | 3/2007 | Tran | |
| 2009/0027337 A1 * | 1/2009 | Hildreth ......................... | 345/158 |
| 2010/0088625 A1 | 4/2010 | Chen | |
| 2010/0231522 A1 * | 9/2010 | Li .......................... | G06F 3/0423 |
| | | | 345/169 |
| 2011/0080351 A1 | 4/2011 | Wikkerink et al. | |
| 2011/0242102 A1 * | 10/2011 | Hess ....................... | B60K 35/00 |
| | | | 345/419 |
| 2012/0086729 A1 * | 4/2012 | Baseley .................. | G06F 3/011 |
| | | | 345/633 |

(Continued)

FOREIGN PATENT DOCUMENTS

WO    2007/093984 A2    8/2007

*Primary Examiner* — Nelson Rosario
(74) *Attorney, Agent, or Firm* — Birch, Stewart, Kolasch & Birch, LLP

(57) ABSTRACT

Disclosed are a display device and a control method thereof. The display device includes a display, a camera capturing a gesture in a three dimensional space; and a controller selectively displaying a virtual keyboard corresponding to a hand gesture for character input on the display when the captured gesture includes the hand gesture for the character input. Accordingly, the virtual keyboard corresponding to the hand gesture for the character input is displayed, so that the user may not perform an additional operation to display the virtual keyboard.

16 Claims, 35 Drawing Sheets

(56) References Cited

U.S. PATENT DOCUMENTS

| | | | |
|---|---|---|---|
| 2012/0218183 A1* | 8/2012 | Givon et al. | 345/157 |
| 2012/0260207 A1* | 10/2012 | Treskunov et al. | 715/773 |
| 2013/0222246 A1* | 8/2013 | Booms et al. | 345/168 |
| 2013/0307768 A1* | 11/2013 | Kim | G06F 3/011 345/156 |
| 2014/0189569 A1* | 7/2014 | Eleftheriou | G06F 3/0233 715/773 |
| 2014/0380241 A1* | 12/2014 | Frey et al. | 715/815 |
| 2015/0121287 A1* | 4/2015 | Fermon | G06F 3/016 715/773 |

* cited by examiner

Fig. 9
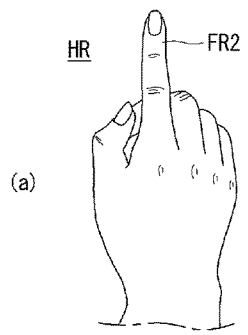
(a)
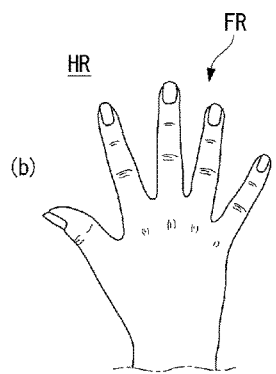
(b)
Fig. 10
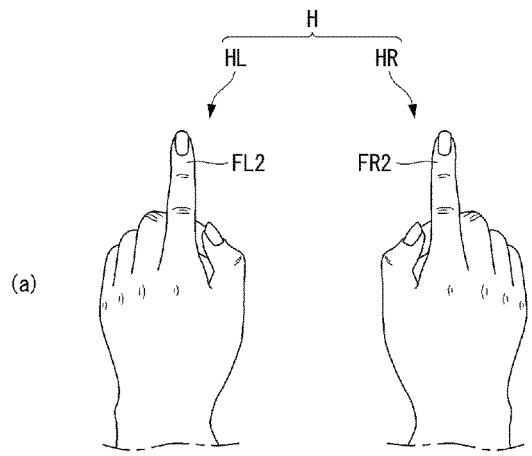
(a)
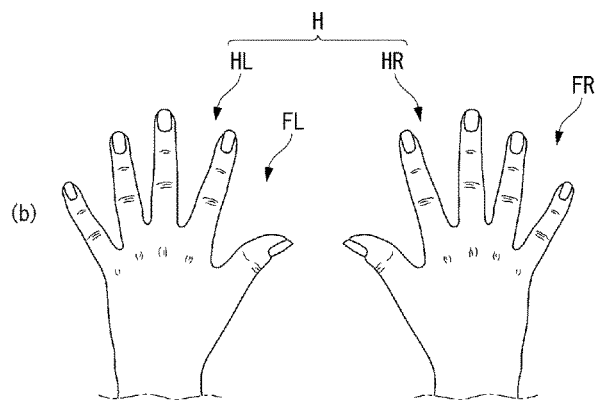
(b)

Fig. 11
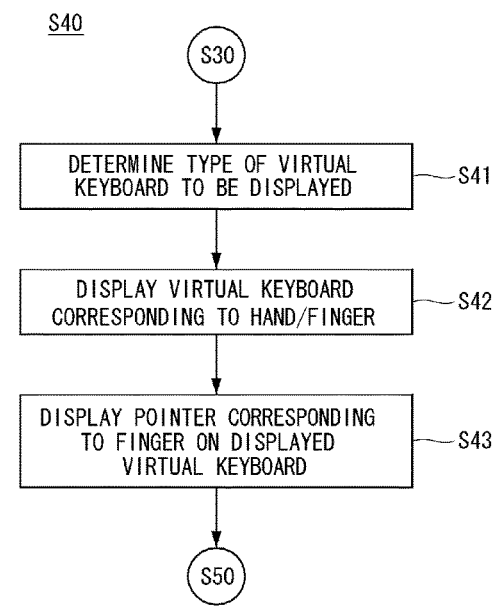
Fig. 12
VK
(a)
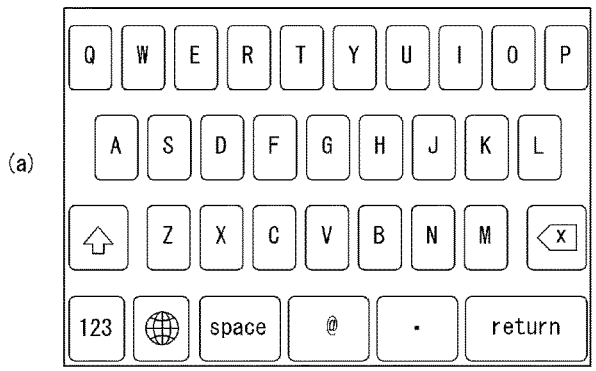
VK
(b)

Fig. 13
VK
(a) 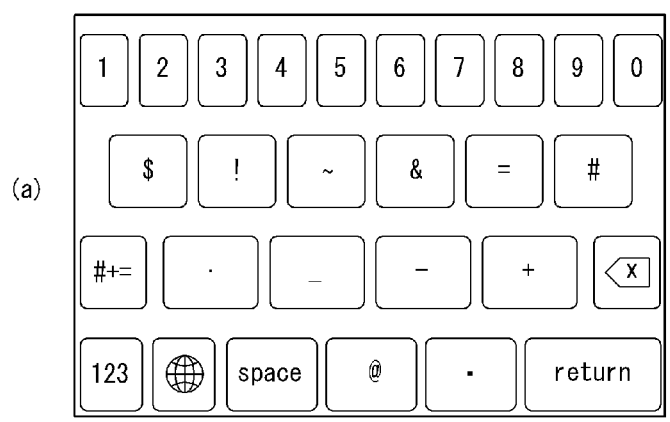
VK
(b) 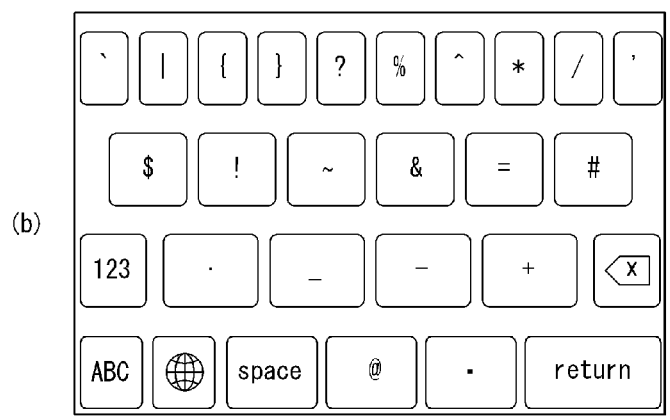

Fig. 19
(a) 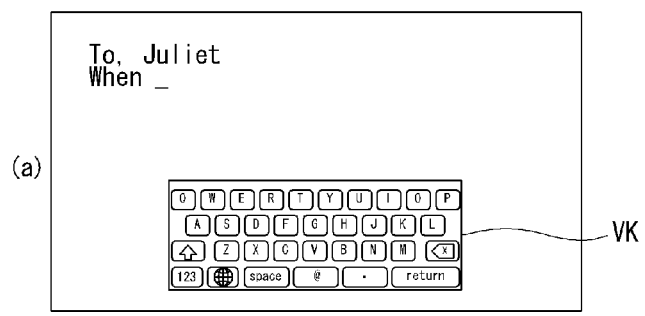
(b) 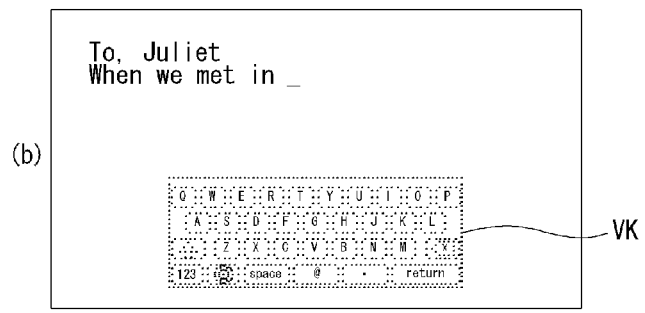
(c) 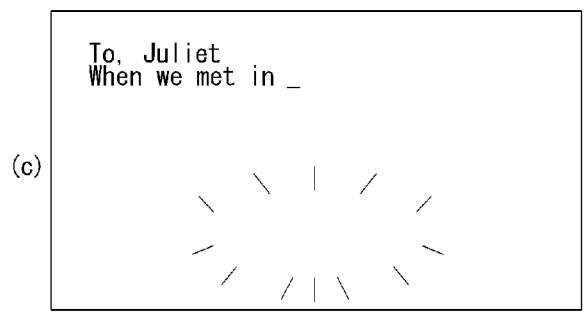

Fig. 20
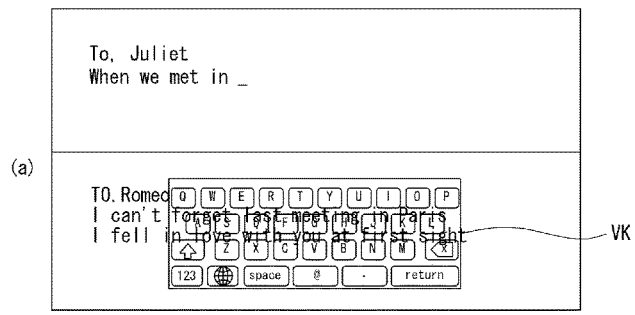
(a)
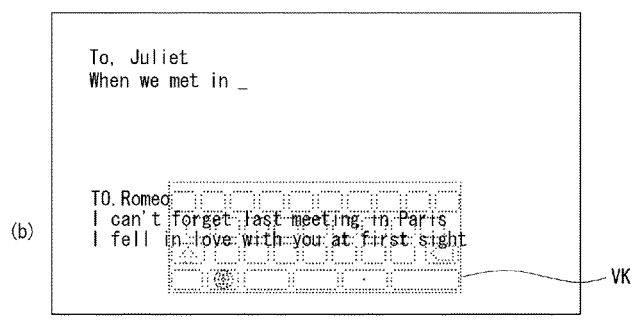
(b)
Fig. 21
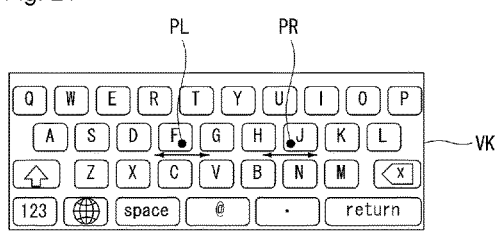
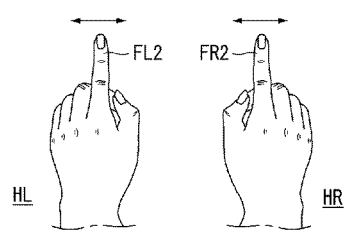

Fig. 22
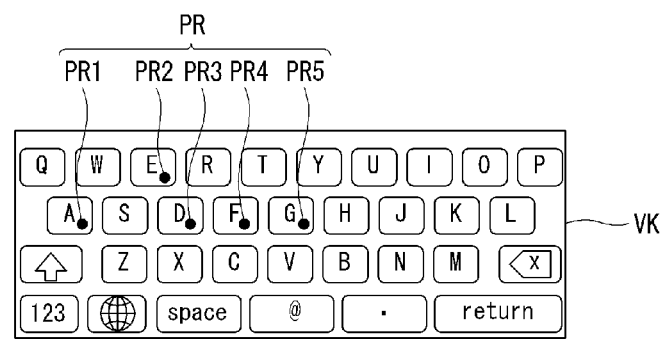
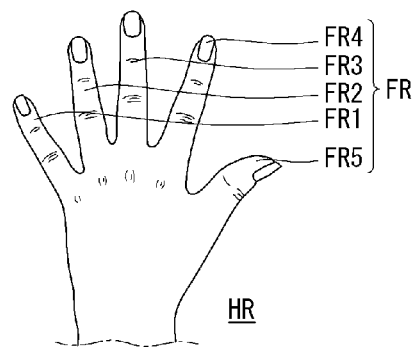

Fig. 27
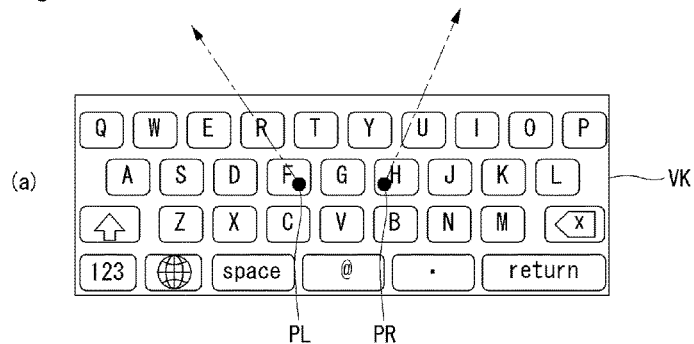
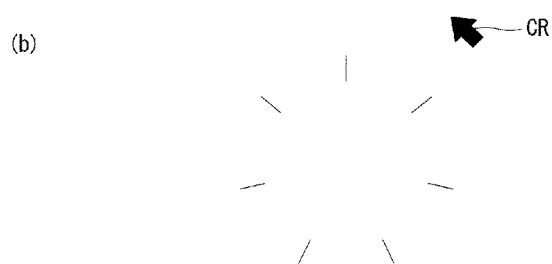
Fig. 28
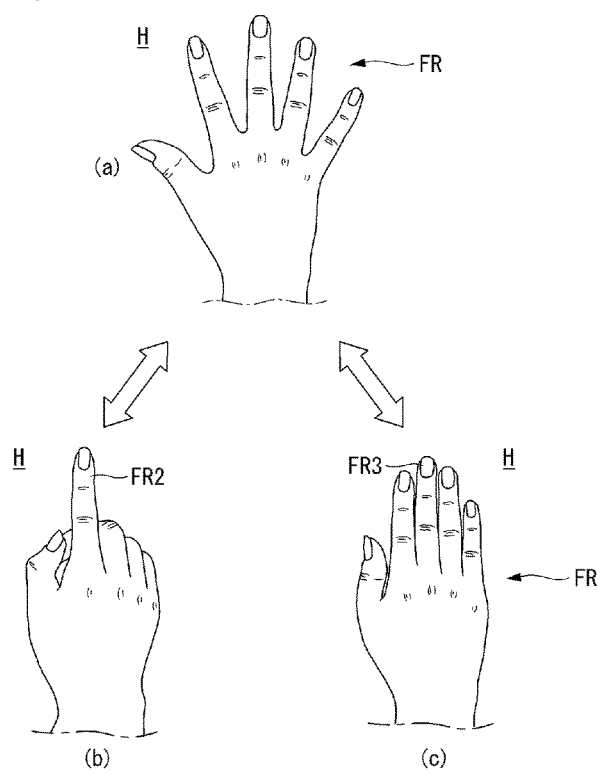

Fig. 29
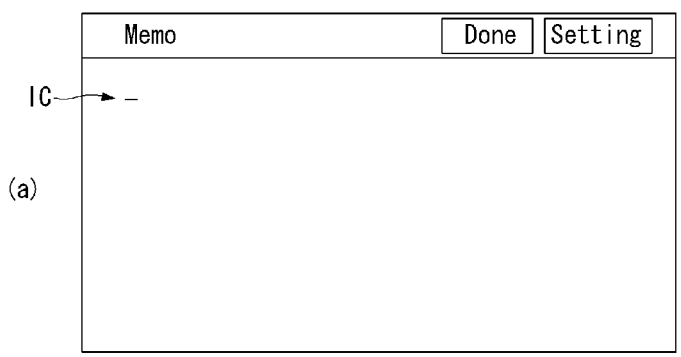
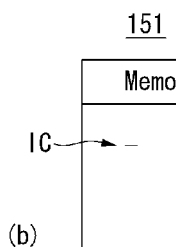
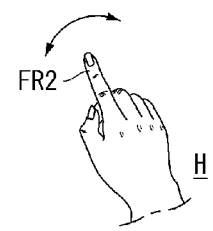

Fig. 30
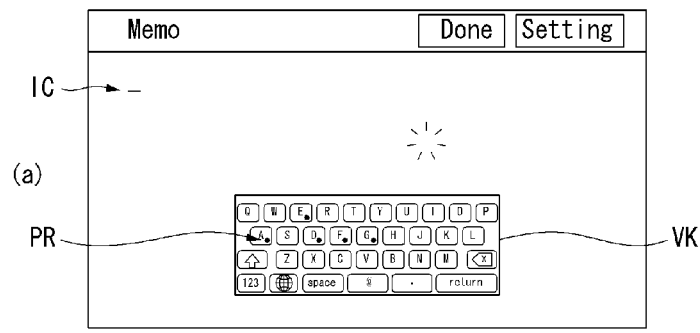
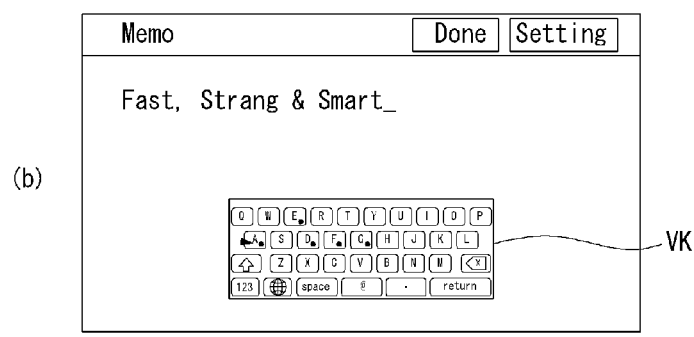
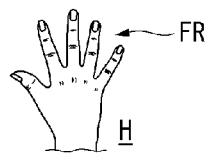

Fig. 31
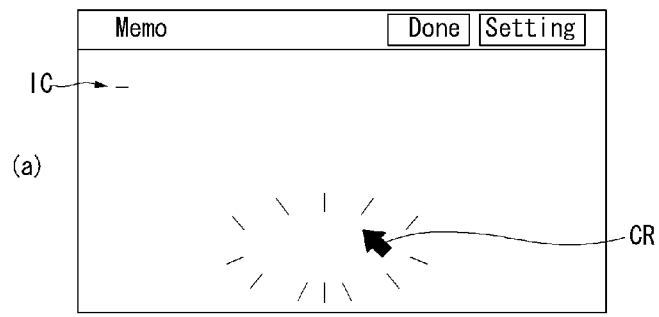
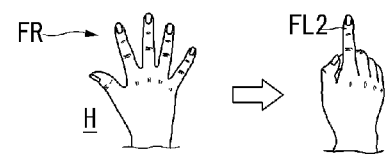
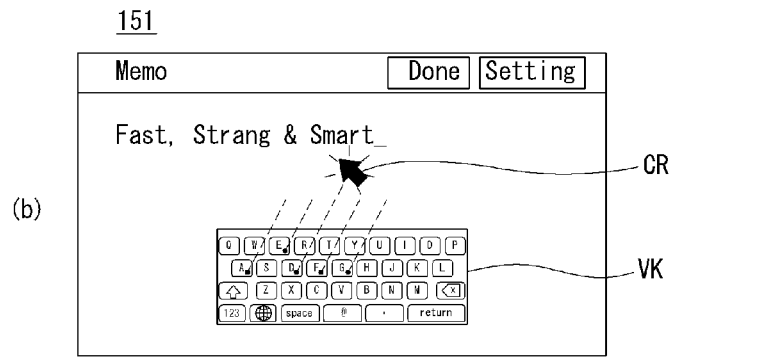
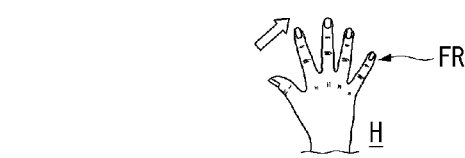
Fig. 32
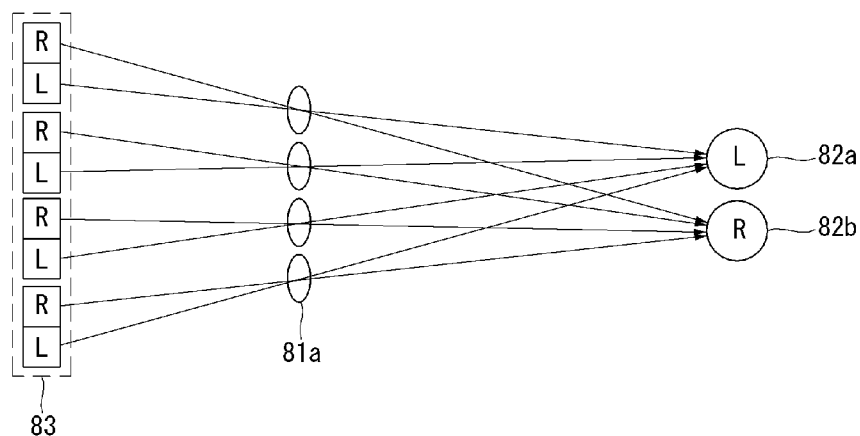

Fig. 44
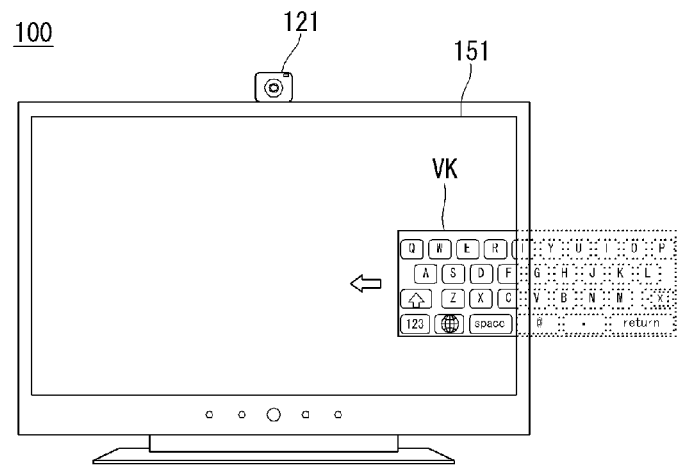
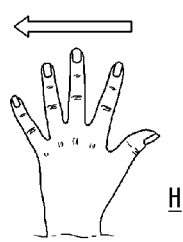

Fig. 45
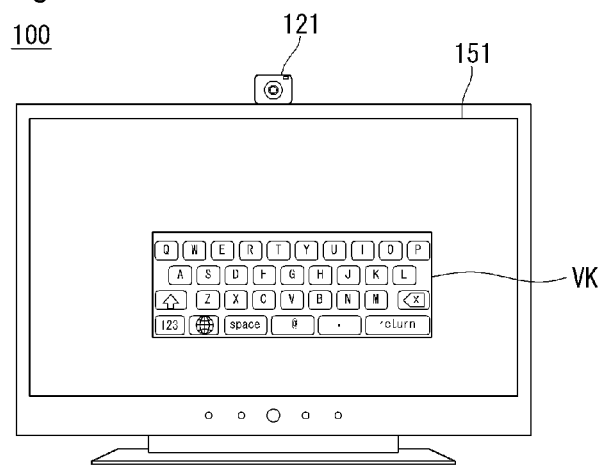
H

Fig. 46
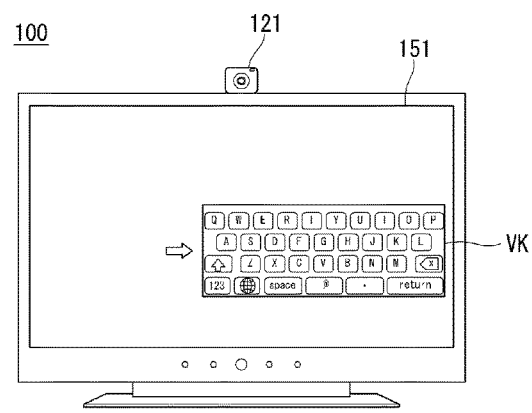
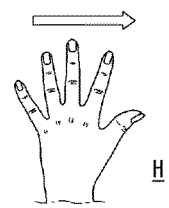
Fig. 47
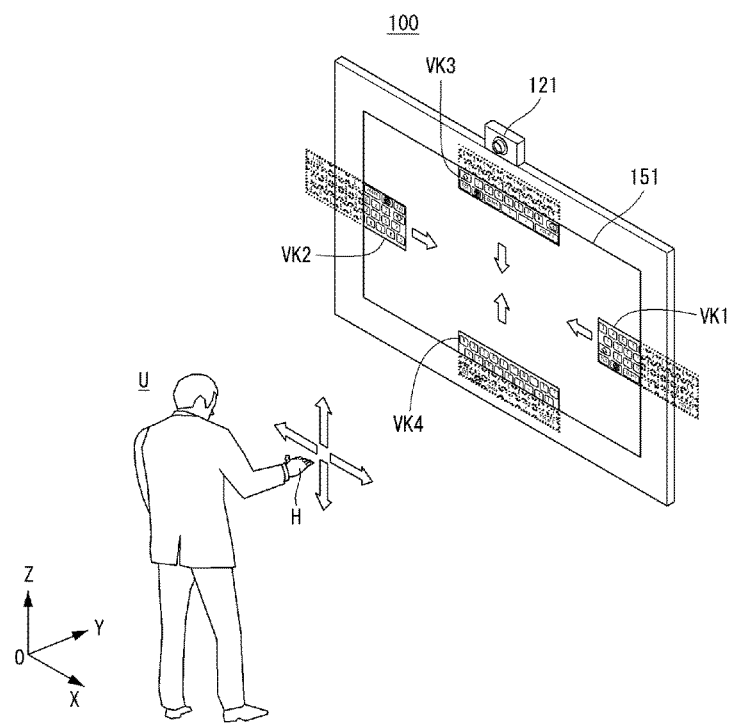

DISPLAY DEVICE AND CONTROL METHOD THEREOF

TECHNICAL FIELD

This document relates to a display device and a control method thereof, and more particularly, to a display device, capable of displaying a virtual keyboard corresponding to a hand gesture for character input so that a user may not perform an additional operation to display the visual keyboard, and a control method thereof.

BACKGROUND ART

The functional diversification of terminals, such as personal computers, laptop computers, cellular phones or the like, has led to the implementation of multimedia player type terminals equipped with complex functions of, for example, capturing motion images, shooting still photos, reproducing music or video files, providing games, receiving broadcasting signals or the like.

Terminals, as multimedia devices, may be called display devices in that they are generally configured to display a variety of image information.

Such display devices may be classified into portable and stationary types according to the mobility thereof. For example, portable display devices may be laptop computers, cellular phones or the like, and the stationary display devices may be televisions, monitors for desktop computers, or the like.

DISCLOSURE OF INVENTION

Technical Problem

It is, therefore, an object of this document to efficiently provide a display device, capable of displaying a virtual keyboard corresponding to a hand gesture for character input so that a user may not perform an additional operation to display the virtual keyboard, and a control method thereof.

Solution to Problem

According to an aspect of this document, there is provided a display device including: a display; a camera capturing a gesture in a three dimensional space; and a controller selectively displaying a virtual keyboard corresponding to a hand gesture for character input on the display when the captured gesture includes the hand gesture for the character input.

The controller may determine whether or not the hand gesture is made for character input, on the basis of at least one of a position and a motion of a hand making the hand gesture.

The position of the hand may include a height of at least one of both hands of a user, a distance between a body of the user and at least one of both hands, and a direction in which at least one of the hands of the user faces with respect to a shooting direction of the camera.

The motion of the hand may include folding and unfolding at least one finger of the hand.

The controller may display the virtual keyboard corresponding to at least one of a position of the hand making the hand gesture for character input, the number of hands, the number of unfolded fingers, and an angle of the hand with respect to a reference surface.

The hand gesture for character input may be made with both hands of the user, the controller divides the virtual keyboard into a plurality of regions to allow inputs, made by the hand gesture of the hands, to correspond to the divided regions, respectively.

The controller may display at least one first pointer corresponding to at least one finger unfolded for the character input on the virtual keyboard.

When a plurality of fingers are unfolded for the character input, the controller may display a plurality of first pointers, respectively corresponding to the plurality of fingers, to vary in at least one of color and shape.

The controller may change a state of the virtual keyboard being displayed when the hand gesture is not made for longer than a first period of time.

The state of the virtual keyboard may include at least one of a state in which the virtual keyboard is activated to enable character input using the hand gesture, a dimming state waiting for character input using the hand gesture when the first period of time elapses, and a state in which the virtual keyboard is inactivated when a second period time elapses from the first period of time.

The hand gesture for the character input may include a gesture made with at least one finger unfolded for the character input, wherein, when the gesture made with the at least one unfolded finger moves outside a region in which the virtual keyboard is displayed, the controller may display a second pointer corresponding to the gesture of the at least one finger.

The controller may cause the displayed virtual keyboard to disappear when the gesture made with the at least one unfolded finger moves completely out of the region in which the virtual keyboard is displayed.

The hand gesture for the character input may be a gesture made with a plurality of spread fingers of a hand making the hand gesture, wherein the controller may cause the displayed virtual keyboard to disappear in the case of a first state in which only one finger of the hand is unfolded, a second state in which at least two of the plurality of fingers are in contact, or a third state in which at least one finger of the hand is folded.

In the first, second or third state, the controller may display a second pointer moving corresponding to one of the hand and the fingers of the hand.

The controller may display the virtual keyboard when the hand gesture for the character input is captured while an application requiring the character input is in operation.

According to another aspect of this document, there is provided a display device including: a display; a camera capturing a gesture in a three dimensional space; and a controller displaying a virtual keyboard corresponding to the captured gesture on the display such that an angle of a hand making the gesture with respect to a reference surface is reflected therein.

The controller may display the virtual keyboard when it is determined that the gesture is a hand gesture for character input, on the basis of at least one of a position and a motion of the hand making the gesture.

The controller may change an angle at which the virtual keyboard is displayed according to a change in an angle between the reference surface and the hand making the gesture.

The controller may fix an angle of the virtual keyboard to be displayed, regardless of the change in angle between the reference surface and the hand making the gesture.

The display may include a panel for displaying a stereoscopic image, wherein the controller may display a stereo disparity for the virtual keyboard, displayed corresponding to the gesture, so as to be substantially the same as a stereo disparity of a user for the hand making the gesture.

The controller may maintain the stereo disparity for the virtual keyboard, displayed corresponding to the gesture, to be the same as the stereo disparity of the user for the hand making the gesture, regardless of a distance between the display and the user making the gesture.

The controller may change the stereo disparity for the virtual keyboard corresponding to the gesture.

The controller may display the virtual keyboard corresponding to the position of the hand in the three dimensional space.

According to another aspect of this document, there is provided a display device including: a display; a camera capturing a gesture in a three dimensional space; and a controller executing a character input mode for displaying a virtual keyboard corresponding to the gesture according to a motion of fingers included in the captured gesture, and a hovering mode for displaying a pointer corresponding to the gesture.

The controller may perform the character input mode when the motion of the fingers is associated with spreading a plurality of fingers of the hand making the gesture.

The controller may convert from the character input mode into the hovering mode when the gesture made with the spread fingers moves completely out of a region in which the virtual keyboard is displayed.

The controller may perform the hovering mode when the motion of the fingers is in a first state in which only one finger of the hand making the gesture is unfolded, a second state in which at least two of the fingers are in contact, or a third state in which at least one finger of the hand is folded.

According to another aspect of this document, there is provided a control method of a display device, including: capturing a gesture of a user in a three dimensional space; and displaying a virtual keyboard corresponding to a hand gesture for character input when the captured gesture includes the hand gesture for the character input.

The displaying of the virtual keyboard may include determining whether or not the hand gesture is made for character input, on the basis of at least one of a position and a motion of a hand making the hand gesture.

The control method may further include displaying on the virtual keyboard at least one first pointer corresponding to at least one finger unfolded for the character input The control method may further include changing a state of the displayed virtual keyboard when the hand gesture is not made for a set period of time.

The control method may further include, when a gesture of at least one finger unfolded for the character input moves outside a region of the virtual keyboard is displayed, displaying a second pointer corresponding to the gesture of the at least one finger.

In the displaying of the virtual keyboard, the virtual keyboard may be displayed so as to reflect an angle between a reference surface and a hand making the gesture.

In the displaying of the virtual keyboard, a stereo disparity for the virtual keyboard displayed corresponding to the gesture may be displayed to be substantially the same as a stereo disparity of a user for a hand making the gesture.

Advantageous Effects of Invention

In the display device and control method thereof according to embodiments of this document, a virtual keyboard corresponding to a hand gesture for character input is displayed, so that the user may not perform an additional operation to display the virtual keyboard.

BRIEF DESCRIPTION OF DRAWINGS

FIGS. 6 through 10 are views illustrating the positions of the hand and fingers.

FIG. 11 is a flowchart illustrating, in detail, the process of displaying a virtual keyboard in FIG. 3.

FIGS. 12 through 13 are views illustrating various types of virtual keyboards.

FIGS. 19 and 20 are views illustrating display states of a virtual keyboard according to a hand position.

FIGS. 21 and 22 are views illustrating a virtual keyboard on which pointers are displayed corresponding to the fingers.

FIGS. 23 through 27 are views illustrating the process of displaying a virtual keyboard in a mobile terminal according to another embodiment of this document.

FIGS. 28 through 31 are views illustrating the process of displaying a virtual keyboard in a mobile terminal according to another embodiment of this document.

FIGS. 32 and 33 are views for explaining a method for displaying a stereoscopic image by using a binocular parallax according to an exemplary embodiment of this document.

FIGS. 44 through 47 are views illustrating the process of displaying a virtual keyboard according to another embodiment of this document.

MODE FOR THE INVENTION

This document will now be described more fully with reference to the accompanying drawings, in which exemplary embodiments of this document are shown. This document may, however, be embodied in many different forms and should not be construed as being limited to the embodiments set forth herein; rather, there embodiments are provided so that this disclosure will be thorough and complete, and will fully convey the concept of this document to those skilled in the art.

Hereinafter, a mobile terminal relating to this document will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
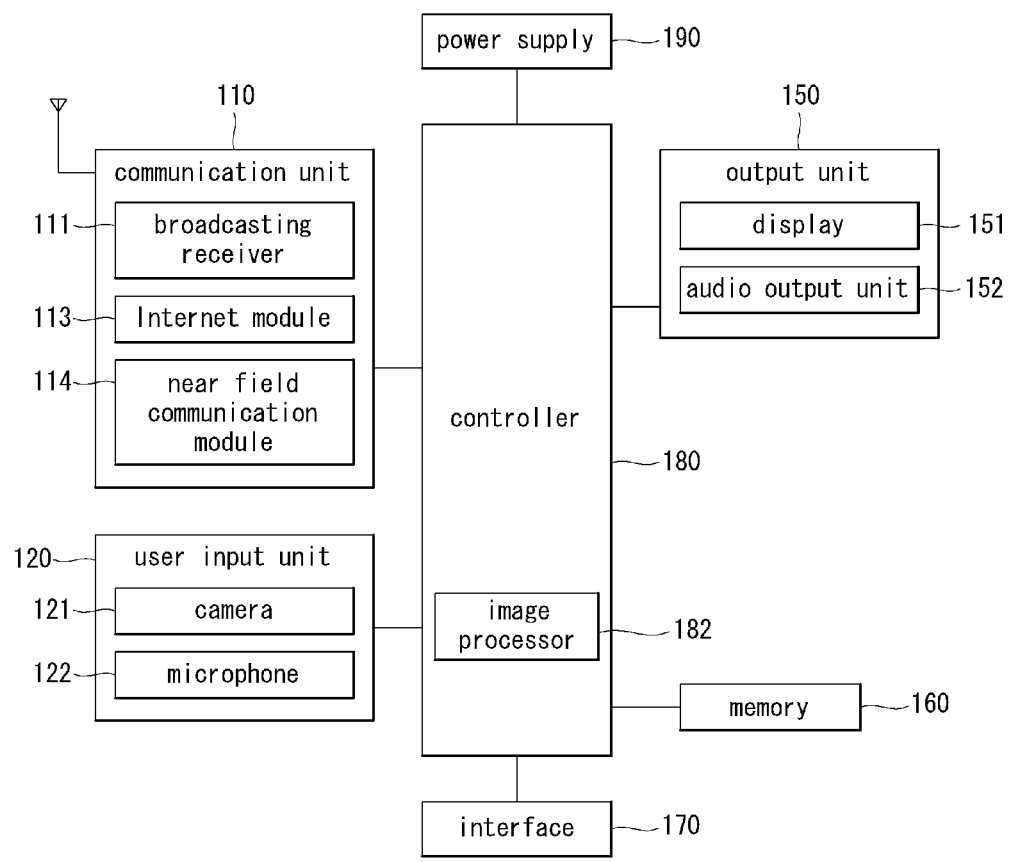
FIG. 1 is a block diagram of a display device relating to an embodiment of this document.

FIG. 1 is a block diagram of a display device relating to an embodiment of this document.

As shown, the display device 100 may include a communication unit 110, a user input unit 120, an output unit 150, a memory 160, an interface 170, a controller 180, and a power supply 190. Not all of the components shown in FIG. 1 may be essential parts and the number of components included in the display device 100 may be varied.

The communication unit 110 may include at least one module that enables communication between the display device 100 and a communication system or between the display device 100 and another device. For example, the communication unit 110 may include a broadcasting receiving module 111, an Internet module 113, and a near field communication module 114.

The broadcasting receiving module 111 may receive broadcasting signals and/or broadcasting related information from an external broadcasting management server through a broadcasting channel.

The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal. The broadcasting signals may include not only TV broadcasting signals, radio broadcasting signals, and data broadcasting signals but also signals in the form of a combination of a TV broadcasting signal and a radio broadcasting signal of a data broadcasting signal.

The broadcasting related information may be information on a broadcasting channel, a broadcasting program or a broadcasting service provider, and may be provided even through a communication network.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. The broadcasting signals and/or broadcasting related information received through the broadcasting receiving module 111 may be stored in the memory 160.

The Internet module 113 may correspond to a module for Internet access and may be included in the display device 100 or may be externally attached to the display device 100.

The near field communication module 114 may correspond to a module for near field communication. Further, Bluetooth, radio frequency identification (RFID), infrared data association (IrDA), ultra wideband (UWB) and/or Zig-Bee may be used as a near field communication technique.

The user input 120 is used to input an audio signal or a video signal and may include a camera 121 and a microphone 122.

The camera 121 may process image frames of still images or moving images obtained by an image sensor in a video telephony mode or a photographing mode. The processed image frames may be displayed on a display 151. The camera 121 may be a 2D or 3D camera. In addition, the camera 121 may be configured in the form of a single 2D or 3D camera or in the form of a combination of the 2D and 3D cameras.

The image frames processed by the camera 121 may be stored in the memory 160 or may be transmitted to an external device through the communication unit 110. The display device 100 may include at least two cameras 121.

The microphone 122 may receive an external audio signal in a call mode, a recording mode or a speech recognition mode and process the received audio signal into electric audio data. The microphone 122 may employ various noise removal algorithms for removing or reducing noise generated when the external audio signal is received.

The output unit 150 may include the display 151 and an audio output module 152.

The display 151 may display information processed by the display device 100. The display 151 may display a user interface (UI) or a graphic user interface (GUI) relating to the display device 100. In addition, the display 151 may include at least one of a liquid crystal display, a thin film transistor liquid crystal display, an organic light-emitting diode display, a flexible display and a three-dimensional display. Some of these displays may be of a transparent type or a light transmissive type. That is, the display 151 may include a transparent display. The transparent display may include a transparent liquid crystal display. The rear structure of the display 151 may also be of a light transmissive type. Accordingly, a user may see an object located behind the body of terminal through the transparent area of the terminal body, occupied by the display 151.

The display device 100 may include at least two displays 151. For example, the display device 100 may include a plurality of displays 151 that are arranged on a single face at a predetermined distance or integrated displays. The plurality of displays 151 may also be arranged on different sides.

Further, when the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 can detect a touched portion of the display 151.

The audio output module 152 may output audio data received from the radio communication unit 110 or stored in the memory 160. The audio output module 152 may output audio signals related to functions, such as a call signal incoming tone and a message incoming tone, performed in the display device 100.

The memory 160 may store a program for operation of the controller 180 and temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk or an optical disk. The display device 100 may also operate in relation to a web storage performing the storing function of the memory 160 on the Internet.

The interface 170 may serve as a path to all external devices connected to the mobile terminal 100. The interface 170 may receive data from the external devices or power and transmit the data or power to internal components of the display device terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The controller 180 may control overall operations of the mobile terminal 100. For example, the controller 180 may perform control and processing for voice communication. The controller 180 may also include an image processor 182 for pressing image, which will be explained later.

The power supply 190 receives external power and internal power and provides power required for each of the components of the display device 100 to operate under the control of the controller 180.

Various embodiments described in this document can be implemented in software, hardware or a computer readable recording medium. According to hardware implementation, embodiments of this document may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented by the controller 180 in some cases.

According to software implementation, embodiments such as procedures or functions may be implemented with a separate software module executing at least one function or operation. Software codes may be implemented according to a software application written in an appropriate software language. The software codes may be stored in the memory 160 and executed by the controller 180.

Figure 2:
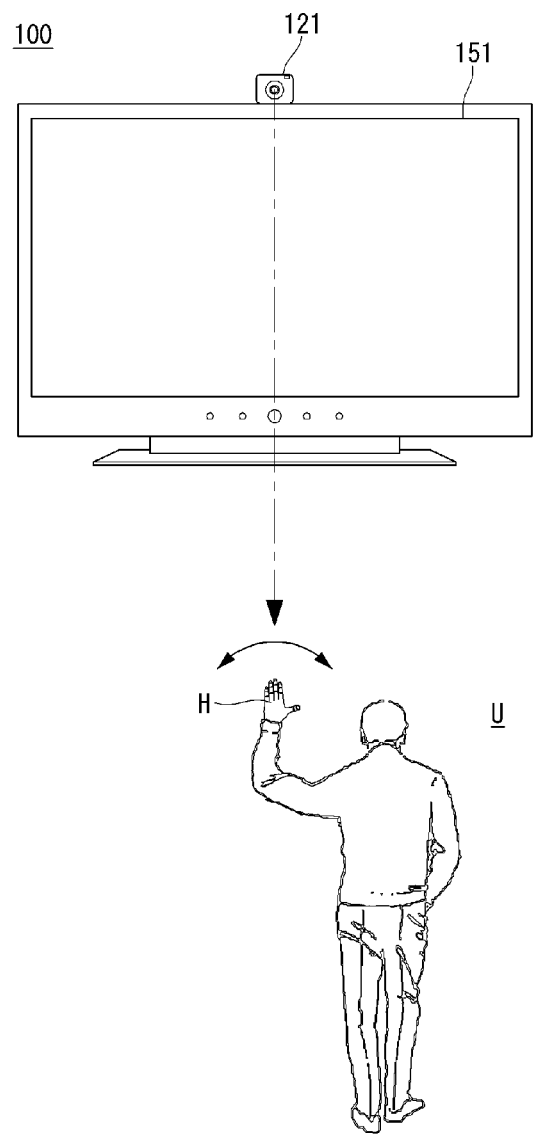
FIG. 2 is a view illustrating an example of a user s gesture input to the display device depicted in FIG. 1.

FIG. 2 is a view illustrating an example of a user's gesture input to the display device depicted in FIG. 1.

As shown in the drawing, the display device 100 according to an embodiment of this document may capture a gesture made by a user U and execute an appropriate function corresponding to the captured gesture.

The display device 100 may be a variety of electronic devices including the display 151 capable of displaying an image. That is, the electronic device 100 may be of a stationary type fixed to a specific location due to its large volume, such as a TV, or of a mobile terminal type such as a cell phone. The display device 100 may be provided with the camera 121 capable of capturing a gesture made by the user U.

The camera 121 may be an optical electronic device that captures the front side of the display device 100. The camera 121 may be a two-dimensional (2D) camera for capturing a 2D image and/or a three-dimensional (3D) camera for capturing a 3D image. In FIG. 2, a single camera 121 is illustrated as being mounted on the central portion of the top edge of the display device 100 for ease of understanding, but the camera 121 may vary in kind, location and number.

When the controller 180 finds the user U having control, the controller 180 may track the user U with control. The control may be given and tracked on the basis of an image captured by the camera 121 provided on the display device 100. That is, the controller 180 may analyze the captured image so as to continuously determine whether or not a specific user U is present, whether or not the specific user U makes a gesture required for the acquisition of control, whether or not the specific user U is moving, and the like.

The controller 180 may analyze a gesture made by the user U having control from the captured image. For example, if a person who is making a specific gesture has not acquired control, a specific function corresponding to the specific gesture may not be executed. However, if the person is the user U having control, the specific function corresponding to the specific gesture can be executed.

The gesture of the user U may be various motions using the body of the user U. For example, the user U's sitting down, standing up, running or moving may be considered to be a gesture. Furthermore, a motion made by using the head, foot, hand H or the like may be considered to be a gesture. Hereinafter, among the various gestures of the user U, a hand gesture that the user U makes using his hand H will be described by way of example. However, this is merely to assist with understanding the embodiment, and the invention is not limited to the user's hand gesture.

Figure 3:
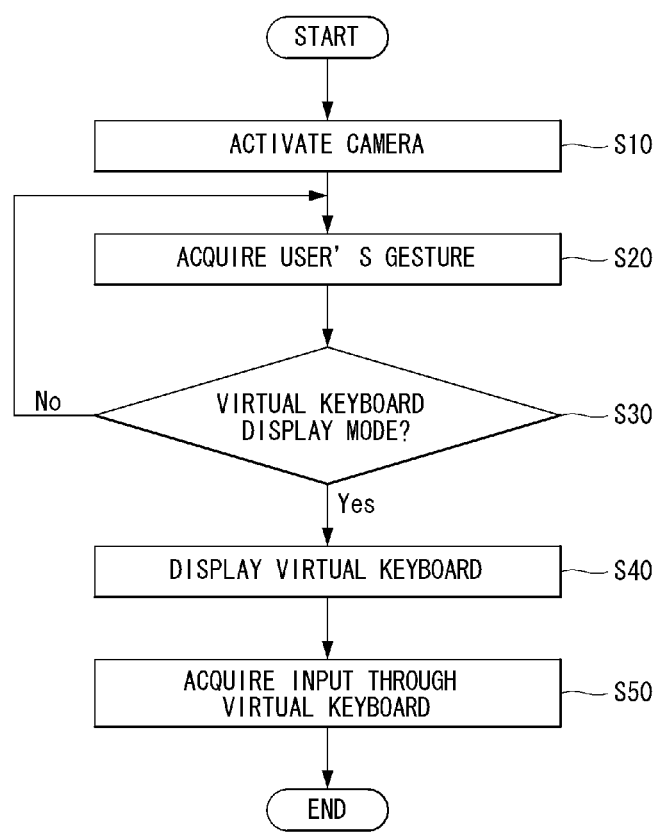
FIG. 3 is a flowchart according to an embodiment of this document.

FIG. 3 is a flowchart according to an embodiment of this document.

As shown therein, the controller 180 of the mobile terminal 100 according to an embodiment of this document may activate the camera 121 in operation S10.

The camera 121 may be selectively activated. For example, the camera 121 may be activated when there is need to acquire the user's gesture. Furthermore, if there are a plurality of cameras 121, only a portion thereof may be selectively activated. For example, a 2D camera may be activated under normal conditions, while a 3D camera may be activated when a specific gesture of the user U needs to be captured.

When the camera 121 is activated, the user U's gesture may be acquired in operation S20.

The user U's gesture may refer to a body motion made by the user U. That is, the gesture may be various gestures made by the user U within a shooting range of the camera 121. Among the various gestures, a motion associated with the hand of the user U may be considered to be a hand gesture. For example, hand-related motions such as raising the hand, moving the hand from side to side, unfolding the fingers, clasping a fist, and the like may be considered to be hand gestures.

The camera 121 may utilize a 2D camera, a 3D camera or both to acquire the user's gesture. For example, the 2D camera may serve to determine whether or not the user U has entered the shooting area of the camera 121, whether or not the user U makes a gesture, or the like. Also, the 3D camera may serve to more clearly and quickly determine which gesture the user U is making. Such division of functions may be appropriately controlled according to differences in processing speed and/or focusing area between the 2D camera and the 3D camera.

It may be determined whether to enter a virtual keyboard (VK in FIGS. 12A and 12B) display mode in operation S30.

When the user U is to input characters, the controller 180 may display a virtual keyboard VK (see FIGS. 12A and 12B). The virtual keyboard VK may be displayed on the display 151. Furthermore, as will be described later, the virtual keyboard VK may be displayed so as to create the impression that it is located adjacent to the hand H of the user U in a 3D virtual space VS (see FIG. 32).

The virtual keyboard display mode may be initiated when the user U makes a gesture to input characters. For example, when the user spreads his fingers in the 3D space in a similar way to inputting characters using an actual keyboard, the virtual keyboard VK may be displayed. The process of entering the virtual keyboard display mode will be described later in the corresponding section.

When the virtual keyboard display mode is initiated, the virtual keyboard VK is displayed in operation S40, and input through the virtual keyboard VK may be acquired in operation S50.

As described above, the input through the virtual keyboard VK may be made on the basis of the user U's gesture captured by the camera 121. That is, when the user U moves his hand and/or finger in the space, input on the virtual keyboard VK may be made accordingly. Since the input may be made on the basis of a gesture obtained from an image captured by the camera 121, a separate device, such as a remote controller, may not be required. Thus, the display device 100 can be more conveniently manipulated.

Figure 4:
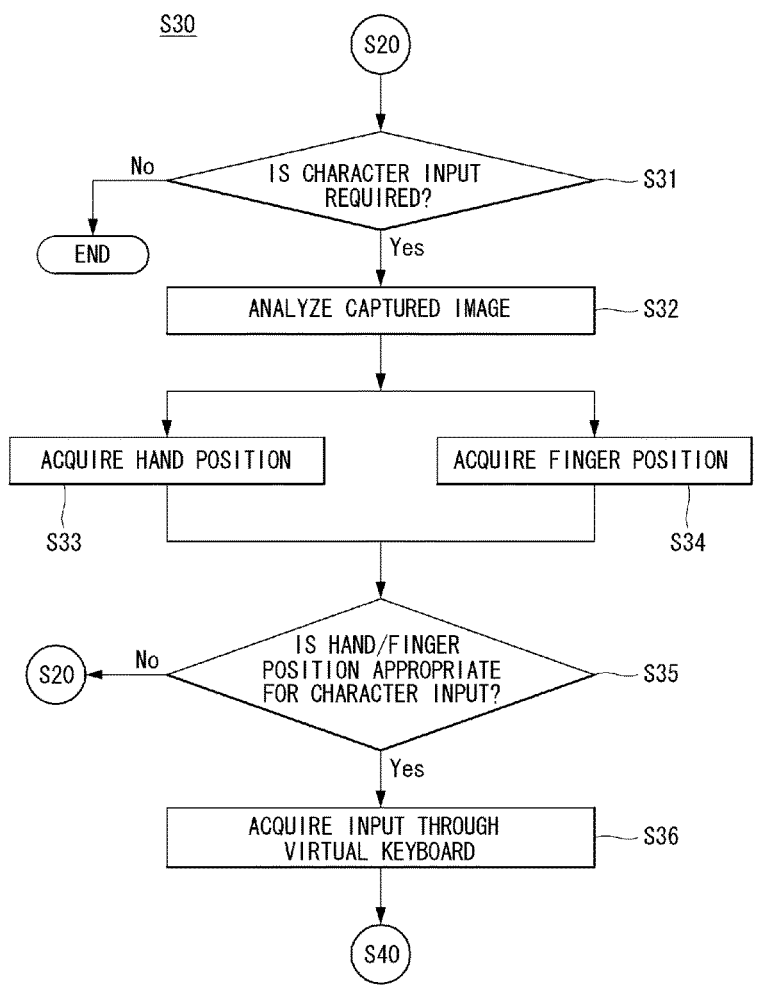
FIG. 4 is a flowchart illustrating a process for a virtual keyboard display mode in FIG. 3.
Figure 5:
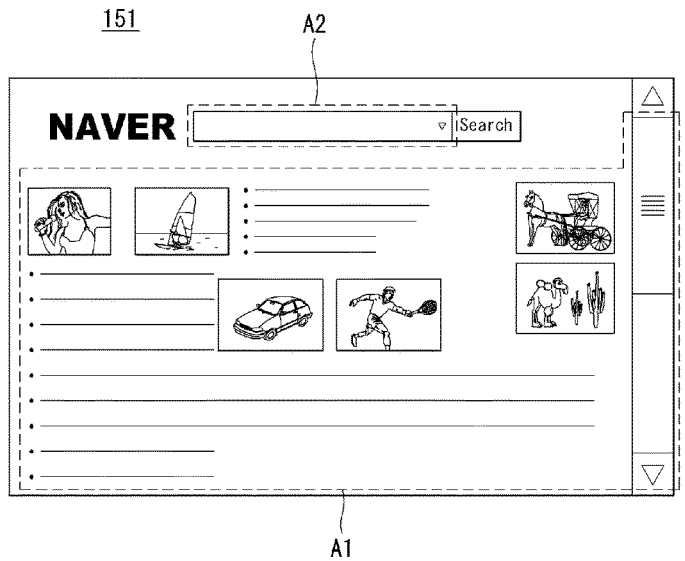
FIG. 5 is a view illustrating a webpage as one exemplary case where the input of characters is required.
Figure 6:
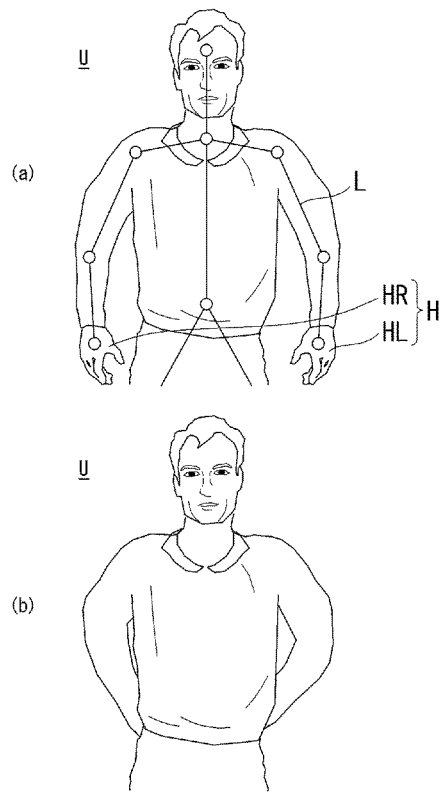
Figure 7:
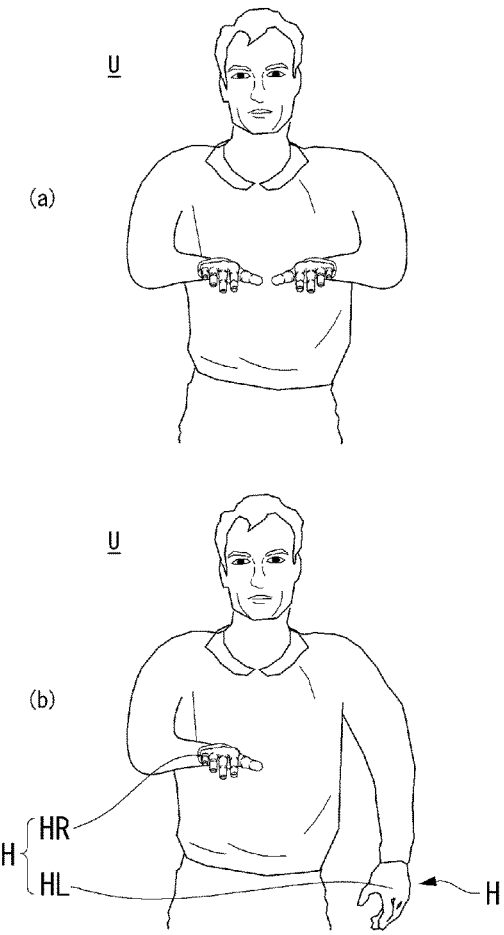
Figure 8:
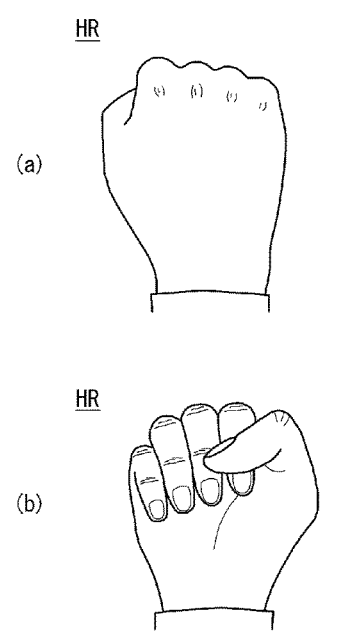

FIG. 4 is a flowchart showing in more detail a process for the virtual keyboard display mode depicted in FIG. 3, and FIG. 5 is a view illustrating a webpage as one example of the case where the input of characters is required. FIGS. 6 through 10 are views showing positions of the hands and fingers.

As shown in the drawings, the display device 100 according to an embodiment of this document may display a virtual keyboard VK to receive character input when the user U makes a gesture to input characters. This may contribute to avoiding inconvenience of making a separate gesture for character input.

As shown in FIG. 4, the operation S30 of FIG. 3 in which it is determined whether to enter the virtual keyboard display mode may include determining whether or not the input of characters is required in operation S31.

In using the display device 100, there may be the case where the input of characters from the user U is required. For example, if a word processor application or a notepad application is in use, the user U may need to input characters. Furthermore, there may be the case where the input of characters needs to be made on a portion of a corresponding application, not the entirety thereof.

As shown in FIG. 5, in the case of a webpage, characters need to be input on a portion designated for search keyword input, but the other portion of the webpage may not be in need of separate character input. That is, characters do not need to be input in a first area A1 where various articles are displayed, while character input is required in a second area A2 designated for keyword input. Accordingly, when the second area A2 is selected by the user U's gesture, the controller 180 determines that the user U has an intention to input characters, and may then display a virtual keyboard VK. In contrast, when the first area A1 is selected by the user U's gesture, the display of the virtual keyboard VK may be released.

When the input of characters is required, a captured image may be analyzed in operation S32.

An analysis of a captured image may be performed by using various image analysis techniques. For example, the captured image may be analyzed by tracking an outline of an image or on the basis of the characteristic appearance of the user U, such as the eyes, nose, mouth, and the like. U. Furthermore, an analysis of the captured image may be carried out on the basis of links L (see FIG. 6) based on positions of the joints of the user U.

Through the above analysis of the captured image, a position of the hand H may be acquired in operation S33, and a position of the fingers F may be acquired in operation S34.

As described above, the gesture may be a hand gesture. The hand gesture may be a motion of changing the position of the hand H in a space by raising the arm, or a motion of folding or unfolding the finger F at a specific position.

On the basis of the positions of the hand H and the finger F, it may be determined whether the positions of the hand H and the finger F are appropriate for the input of characters in operation S35.

As in the case depicted in FIGS. 6A and 6B, if the position of the hand H of the user U is inappropriate for gesture input, the controller 180 may determine that the user U does not have an intention to input characters.

As shown in FIG. 6A, the user U may have his hands H facing downwards. That is, the user U may let the left hand H and the right hand HR hang down from the shoulders. If such a gesture is input through the camera 121, the controller 180 may determine that the user U has no intention to input characters. That is, this may be the situation where the position of the hand H is inappropriate for character input.

As shown in FIG. 6B, the user U may have his hands H behind the back. When such a gesture is input through the camera 121, the control 180 may determine that the user U has no intention to input characters.

As shown in FIG. 7A, the user U may slightly put up his hands H in front of the body. Since the user U puts up the hand H in front of the body toward the camera 121, the controller 180 may determine that the user U has an intention to input characters by using both hands H.

As shown in FIG. 7B, the user U may put up only one hand H. That is, the left hand HL may hang down from the shoulder while only the right hand HR is held up. In this case, the controller 180 may determine that the user U has an intention to input characters with the right hand HR.

As shown in FIGS. 8A and 8B, the user U may make a fist with his right hand HR. If the user U is making a gesture of clenching the fist, it may be determined that the user U has no intention to input characters at the corresponding time point at least.

As shown in FIG. 9A, the user U may unfold the index finger FR2 of the right hand HR. When this gesture is input, the controller 180 may determine that the user U has an intention to perform character input using a single finger of one hand.

As shown in FIG. 9B, the user U may unfold all the five digits (fingers) FR of his right hand HR. This gesture may be similar to a gesture of typing on a keyboard. Thus, the controller 180 may determine that the user U is making a standby gesture for character input.

As shown in FIG. 10A, the user U may make a gesture of unfolding the index finger FR2 of the right hand HR and the index finger FL2 of the left hand HL. This gesture may be a gesture that the user U makes to input characters with the two fingers FR2 and FL2.

As shown in FIG. 10B, the user U may make a gesture of spreading both the left hand HL and the right hand HR. This gesture may be a gesture that the use U makes to input characters with both hands HL and HR.

If the positions of the hands and/or the fingers FR and FL are considered to be appropriate for character input, the virtual keyboard display mode may be initiated in operation 36.

The controller 180 may initiate the virtual keyboard display mode when character input is required and the finger(s) and/or the hand(s) are in appropriate position for the character input on the basis of the user U's gesture. That is, the virtual keyboard VK may be displayed on the display 151.

FIG. 11 is a flowchart of the concrete process of displaying the virtual keyboard depicted in FIG. 3. FIGS. 12A through 13B are views illustrating types of virtual keyboard. FIGS. 14 through 18 are views illustrating the display of a virtual keyboard corresponding to the hand(s) or finger(s). FIGS. 19A through 20B are views illustrating a display state of a virtual keyboard according to the position of the hand. Furthermore, FIGS. 21 and 22 are views illustrating a virtual keyboard displaying pointers corresponding to the fingers.

As shown in the drawings, in the display device 100 according to an embodiment of this document, the displaying of a virtual keyboard VK in operation S40 depicted in FIG. 3 may include determining a type of virtual keyboard VK to be displayed in operation S41.

The virtual keyboard VK may be displayed in various forms. For example, the virtual keyboard VK may be a QWERTY type keyboard or a number only keyboard.

As shown in FIGS. 12A through 13B, in the case of a QWERTY type keyboard arrangement, the virtual keyboard may be an English keyboard as shown in FIG. 12A, a Korean keyboard as shown in FIG. 12B, a number and special-character keyboard as shown in FIG. 13A, or a special-character keyboard as shown in FIG. 13B. The virtual keyboards VK in FIGS. 12A through 13B are illustrated by way of example, and various types of virtual keyboards may be displayed on the display 151.

After the type of virtual keyboard VK to be displayed is determined, the virtual keyboard VK may be displayed corresponding to the hand(s) H and the finger(s) F in operation S42.

The virtual keyboard VK may be displayed corresponding to the user U's hand(s) H and finger(s) F used for input. For example, the display of the virtual keyboard VK or a region of the virtual keyboard VK corresponding to each hand may be varied according to whether the user U inputs characters with one hand or both hands and how many fingers are used to input characters. Furthermore, the display state of the virtual keyboard may be varied according to an angle between a specific plane and the hand H and/or finger F, and the like.

Figure 14:
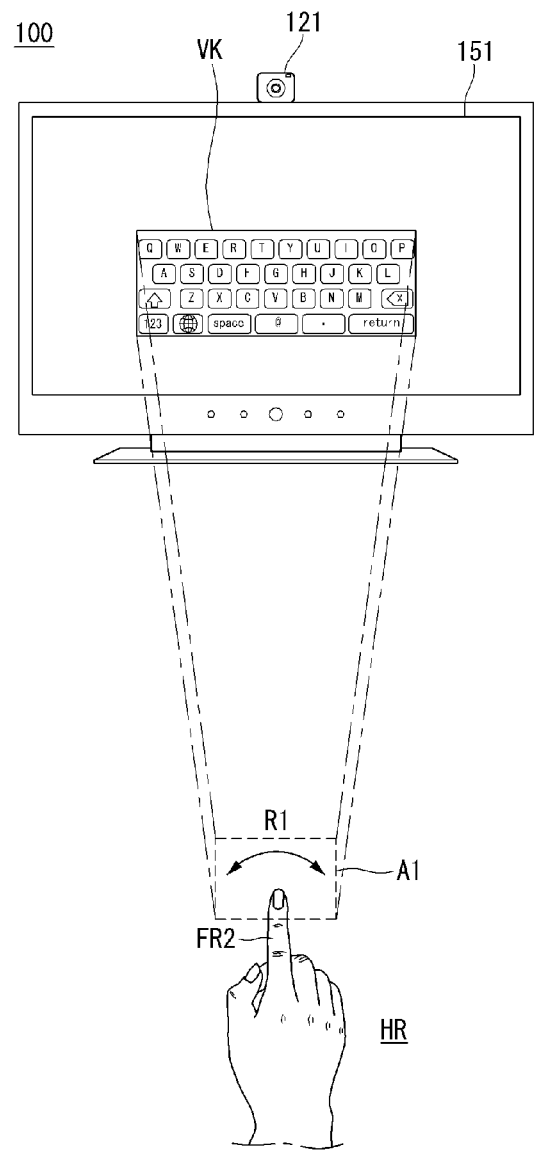
FIGS. 14 through 18 are views illustrating the display of a virtual keyboard corresponding to the hand and/or the fingers.

As shown in FIG. 14, when a gesture of raising the user's right hand HR toward the camera 121 in order to input characters is captured, the controller 180 may determine that the user has an intention to input characters with only one finger of one hand of the user. Accordingly, the controller 180 may display on the display 151 the virtual keyboard VK corresponding to the user's gesture.

The displayed virtual keyboard VK may correspond to a gesture area in which the right hand HR lifted for character input is expected to move. That is, in the case where the user unfolds only the index finger FR2 while folding other fingers, a first gesture area A1 corresponding to a first gesture range R1 in which the index finger FR2 can move may correspond to the entirety of the virtual keyboard VK. Accordingly, the user may touch the virtual keyboard VK from the very left button to the very right button by moving only the index finger FR2 from side to side without moving the right hand HR to a large extent.

Figure 15:
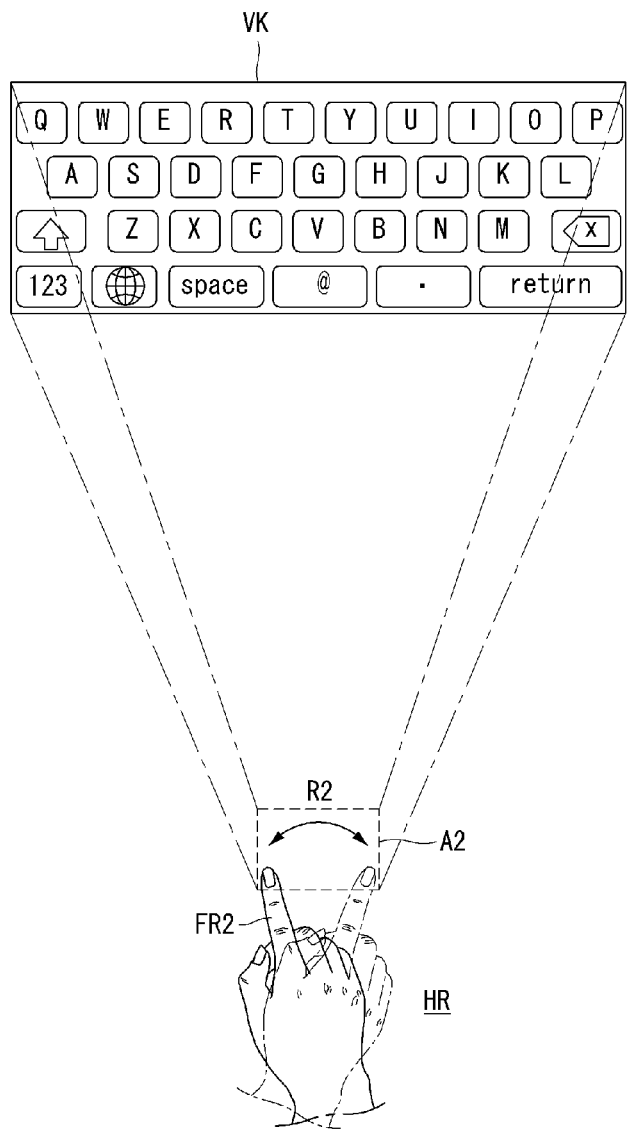

As shown in FIG. 15, the controller 180 may display the virtual keyboard VK to match a second gesture area A2 corresponding to a second gesture range R2 in which the user moves the right hand HR within a predetermined range.

Figure 16:
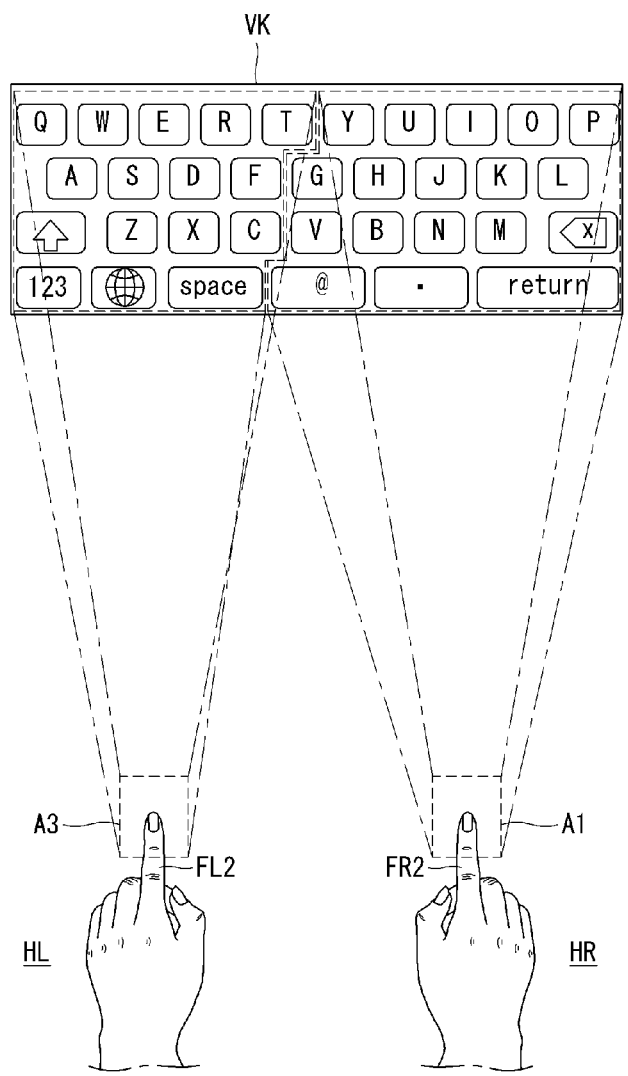

As shown in FIG. 16, the controller 180 may display the virtual keyboard VK to match first and third gesture areas A1 and A3 respectively corresponding to the right hand HR and left hand HL of the user. That is, the first gesture area A1 may correspond to the right half of the virtual keyboard VK, and the third gesture area A3 may correspond to the left half of the virtual keyboard VK. In this case, the first and third gesture areas A1 and A3 may correspond to the right index finger and the left index finger FR2 and FL2.

Figure 17:
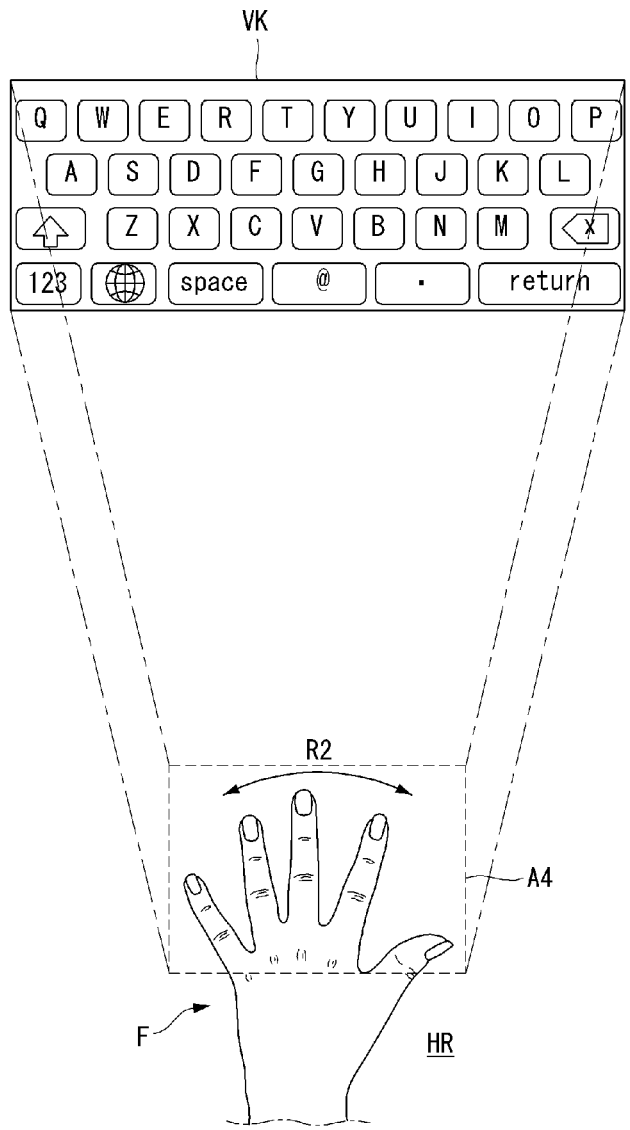

As shown in FIG. 17, the controller 180 may display the virtual keyboard VK to match a fourth gesture area A4, the gesture range of the five fingers FR of the right hand HR of the user. The fourth gesture area A4 may correspond to a third gesture range R3 in which the five fingers F of the right hand HR move.

Figure 18:
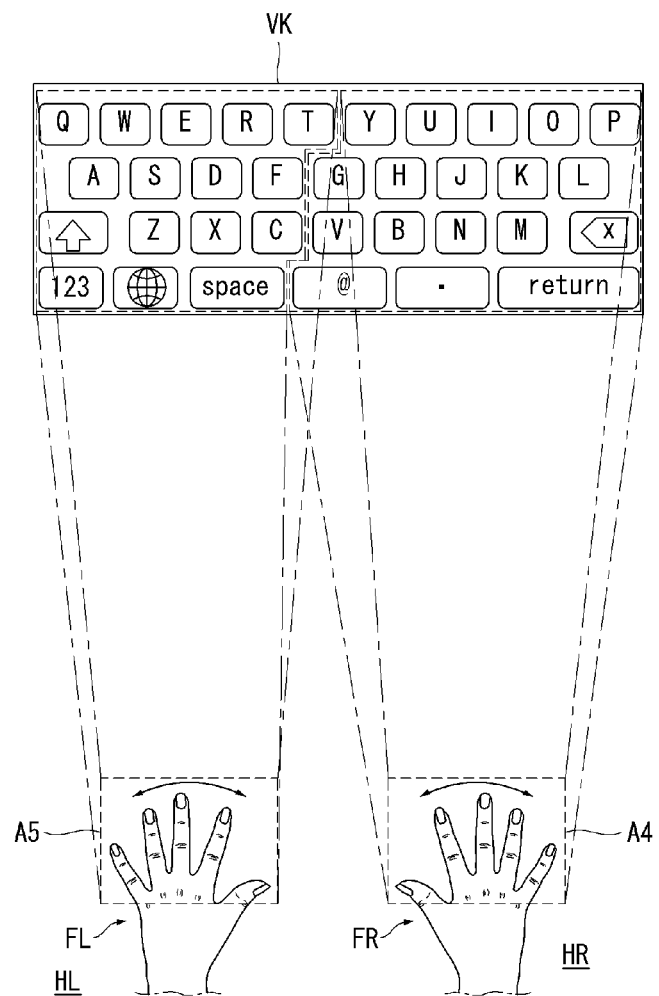

As shown in FIG. 18, the controller 180 may display the virtual keyboard VK to match a fourth gesture area A4, which is a gesture range of the five fingers FR of the right hand HR of the user, and a fifth gesture area A5, which is a gesture range of the five fingers FL of the left hand HL. That is, the right half of the virtual keyboard corresponds to the fourth gesture area A4, and the left half thereof may correspond to the fifth gesture area A5.

Since the entirety or a portion of the virtual keyboard VK corresponds to the gesture range of each hand or finger, the user may input characters without greatly moving the hand. Accordingly, fatigue caused by the gesture input may be reduced.

As shown in FIG. 19A through 19C, the controller 180 may change a display state of the virtual keyboard VK according to a captured gesture of the user. That is, the virtual keyboard VK may be changed corresponding to the user's gesture.

As shown in FIG. 19A, when the user shows an intention to input characters, the controller 180 may display a virtual keyboard VK on the display 151. For example, when the user makes a gesture of raising the hand of the user or a gesture giving the impression that the user spreads his fingers to type on the keyboard, the controller 180 may determine that the user has an intention to input characters. When it is determined that the user has an intention to input characters, the controller 180 may display the virtual keyboard VK on the display 151.

As shown in FIG. 19B, when an intention to temporarily stop inputting characters is expressed, the controller 180 may perform dimming upon the virtual keyboard VK being displayed on the display 151. In this case, the virtual keyboard VK may be dimmed as compared to that under normal conditions.

The user's intention to temporarily stop inputting characters may be learned by analyzing the user's gesture. For example, if the user who was inputting characters puts down his hand H, the controller 180 may determine that the user has an intention to temporarily stop the character input operation. If this state is captured through the camera 121 or continued for a predetermined period of time, the controller 180 may dim the virtual keyboard VK. However, in the above state, if the user puts up his hand again, the controller 180 determines that the user tries to resume the character input operation, and changes the dimmed virtual keyboard VK into an initial display state. That is, in the situations where the character input is not required for a while, the user can put down his hand in a relaxing manner and then resume the character input operation. Accordingly, the character input operation using gestures can be carried out more conveniently.

As shown in FIG. 19C, when it is determined that the user shows an intention to no longer input characters, the controller 180 may release the display of the virtual keyboard VK. For example, if the hand is put down for longer than a predetermined period time, the virtual keyboard VK being displayed is dimmed. In this state, if a pre-determined elapses, the display of the virtual keyboard VK may disappear.

As shown in FIGS. 20A and 2B, the dimming effect of the virtual keyboard VK can contribute to enhancing the convenience of the user input operation.

As shown in FIG. 20A, the virtual keyboard VK may be displayed on the display 151. The virtual keyboard VK is displayed in a bold style, so characters behind the virtual keyboard VK is invisible.

As shown in FIG. 20B, when the user makes a gesture of temporarily stop the input operation, such as putting down his hand, the controller 180 may dim the virtual keyboard VK being displayed. As the virtual keyboard VK is dimmed and becomes semitransparent, the characters behind the virtual keyboard VK may be displayed through the semitransparent virtual keyboard VK. Accordingly, the user can view an image which was hidden by the virtual keyboard VK.

When the virtual keyboard corresponding to the hands and the fingers is displayed, pointers corresponding to the fingers may be displayed on the displayed virtual keyboard VK in operation S43.

When characters are input using a gesture, the user may want to know a location in the virtual keyboard VK corresponding to the user's gesture. That is, considering the features of a gesture made in a 3D space, if there is no separate indication, feedback regarding the location of each finger of the user on the virtual keyboard VK may be required. Without the feedback, the user may need to input characters based on experiences or feelings, thereby increasing erroneous inputs, such as typos.

As shown in FIG. 21, the controller 180 may display on the displayed virtual keyboard VK a left-hand finger pointer PL and a right-hand finger pointer PR respectively corresponding to the index finger FL2 of the user's left hand HL and the index finger FR2 of the right hand HR. When the user moves the index finger FL2 of the left hand, the left-hand finger pointer PL may move accordingly. The right-hand finger pointer PR may also move in the same manner as above. By displaying pointers corresponding to the fingers currently used to input characters, the user can intuitively recognize characters to be input.

As shown in FIG. 22, the controller 180 may display, on the virtual keyboard VK, right-hand finger pointers PR respectively corresponding to the five fingers FR of the user's right hand HR. That is, first to fifth right-hand finger pointers PR1 through PR5 respectively corresponding to the first to fifth fingers FR1 through FR5 of the right hand HR may be displayed on the virtual keyboard VK.

FIGS. 23 through 27 are views illustrating the process of displaying a virtual keyboard in a mobile terminal according to another embodiment of this document.

As shown in the drawings, a mobile terminal 100 according to another embodiment of this document may display a virtual keyboard VK corresponding to a gesture, or release the display of the virtual keyboard VK.

Figure 23:
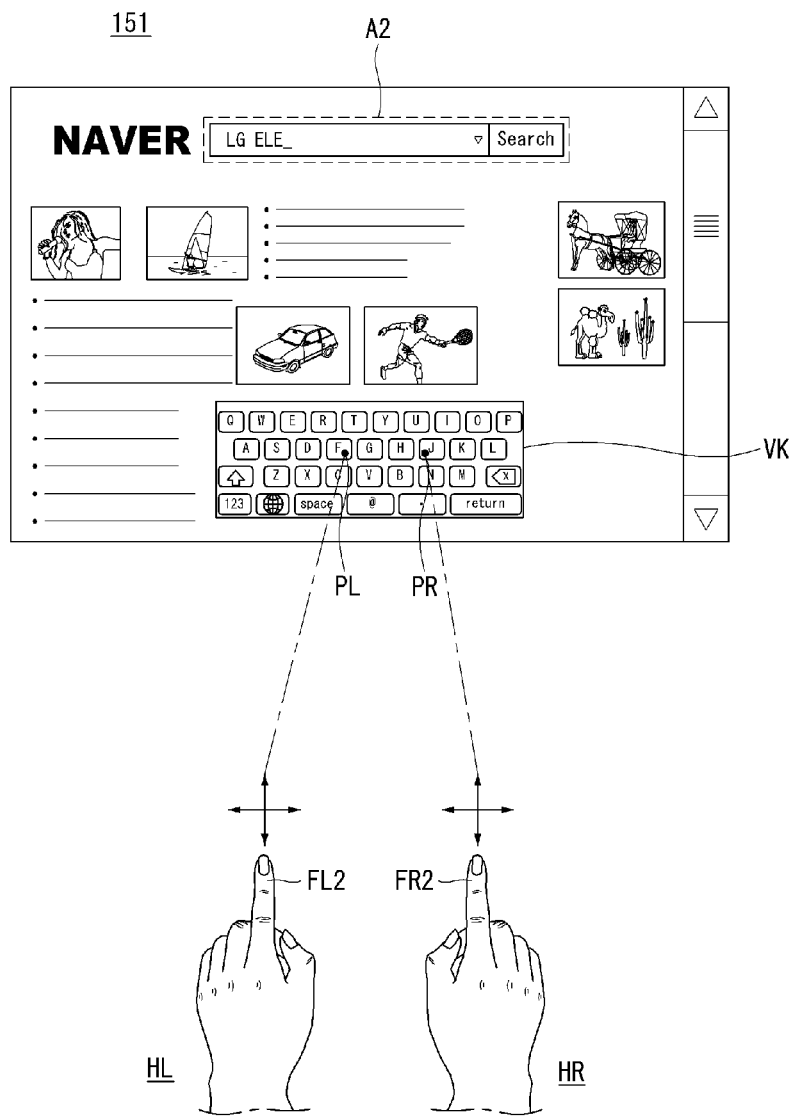

As shown in FIG. 23, the user may input desired characters by using a gesture. For example, the user may select a desired character among characters on the virtual keyboard VK by hovering over the virtual keyboard VK with the right hand HR and/or the left hand HL. A left-hand finger pointer PL and/or a right-hand finger pointer PR may be displayed at locations corresponding to the index finger FR2 of the right hand H$ and/or the index finger FL2 of the left hand HL. The left-hand finger pointer PL and/or the right-hand finger pointer PR being displayed allow the user to intuitively recognize a location in the virtual keyboard VK corresponding to the gesture.

The virtual keyboard VK may be displayed on the display 151 when the user expresses an intention to input characters using a gesture in the state where a second area A2 for character input has been activated to enable character input. For example, the virtual keyboard VK may be displayed when the user makes a gesture as illustrated with his left hand HL and right hand HR in the state where the second area A2 has been selected.

Figure 24:
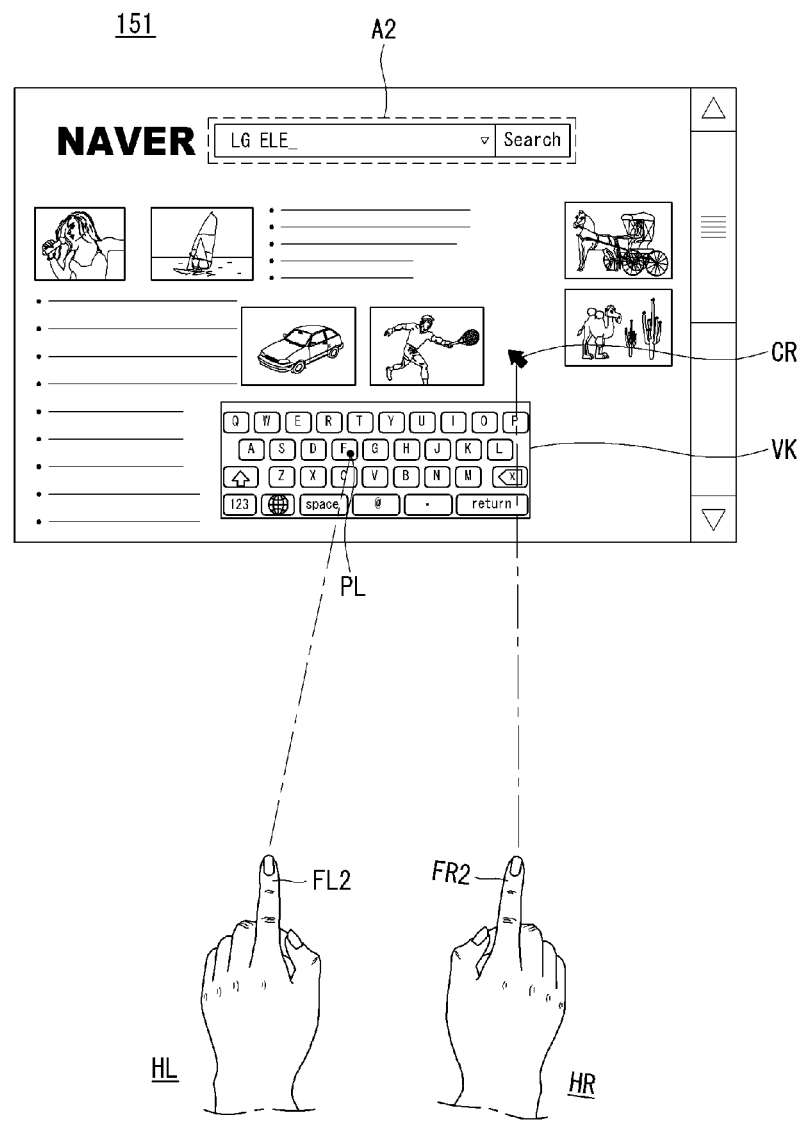
Figure 25:
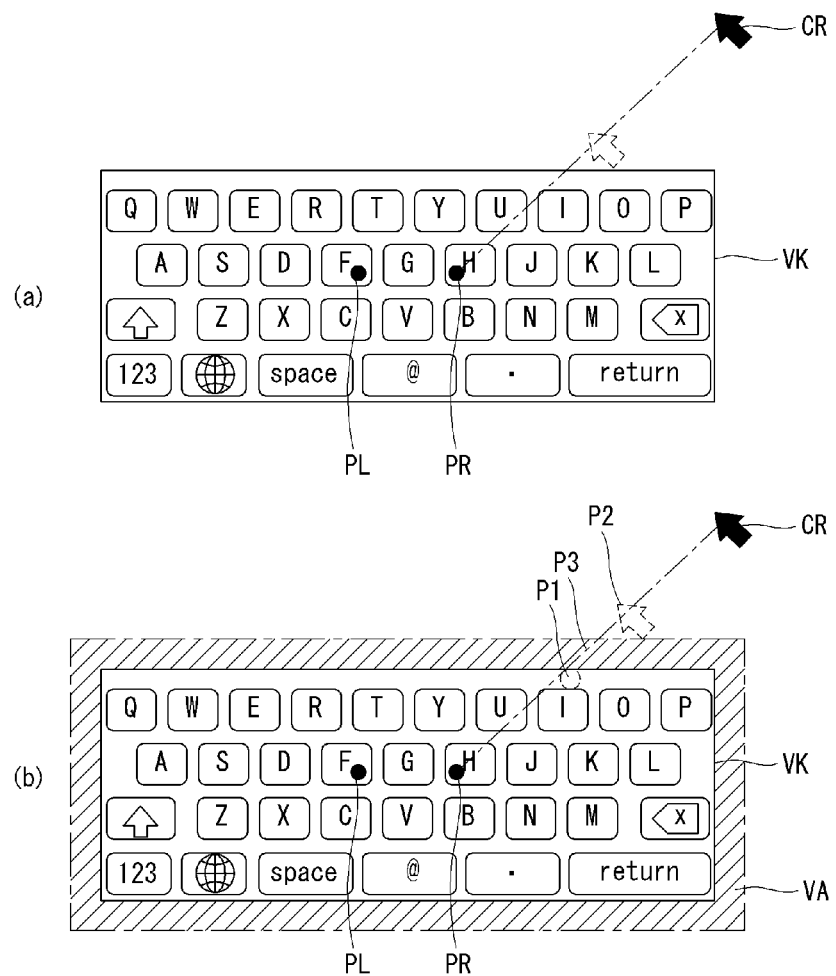

As shown in FIG. 24, the user may make a gesture of moving one of the hands, which are inputting characters, out of a region where the virtual keyboard VK is displayed (hereinafter, referred to as a VK region). When the user makes a gesture of moving the hand outside the VK region, the controller 180 may display a hovering pointer CR on a spot corresponding to the gesture. For example, the user may make a gesture of moving the index finger FR2 of the right hand HR outside the VK region is displayed while locating a left-hand finger pointer PL, corresponding to the index finger FL2 of the left hand HL, inside the VK region.

When the gesture of moving the finger outside the virtual keyboard VK is made, a hovering pointer CR may be displayed at a corresponding spot, so that the user can control the hovering pointer CR with his right hand HR while inputting characters with his left hand HL.

As shown in FIGS. 25A and 25B, the controller 180 may display a hovering pointer CR when the user's gesture is made outside the VK region.

As shown in FIG. 25A, a left-hand finger pointer PL corresponding to the user's gesture is located inside the VK region, while a right-hand finger pointer PR may move outside the VK region. The right-hand finger pointer PR, when moving outside the VK region, may be changed into a hovering pointer CR.

As shown in FIG. 25B, the right-hand finger pointer PR may be moved out of the VK region by the user's gesture, and changed into a hovering pointer Cr.

A buffer region VA may be present around the virtual keyboard VK. The buffer region VA may prevent the right-hand finger pointer PR from unintentionally moving outside the virtual keyboard VK. That is, when the right-hand finger pointer PR is moved by a gesture and then located at a first spot P1, the right-hand finger pointer PR may be fixed at the first spot P1 until the gesture moves in the same direction and reaches a second spot P2.

Due to the existence of the buffer region VA between the first spot P1 and the second spot P2, the right-hand finger pointer PR may be fixed at the first spot P1 even when the user's gesture moves to a third point P3 and then to the first spot P1.

Figure 26:
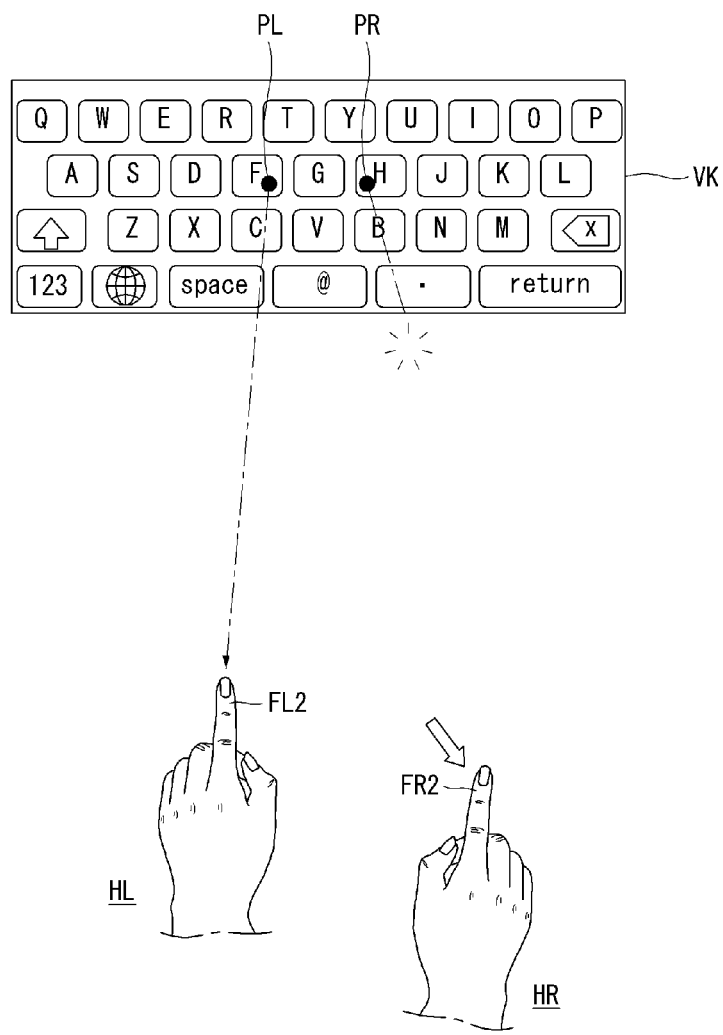

As shown in FIG. 26, the hovering pointer CR may not be displayed depending on a direction in which the pointer moves. For example, if the user moves the right hand HR downwardly, the right-hand finger pointer PR may move outside the VK region. Unlike the case depicted in FIGS. 25A and 25B, when the gesture moving downwardly of the virtual keyboard VK is detected, the right-hand finger pointer PR may disappear without becoming the hovering pointer CR. That is, the downward motion of the hand with respect to the virtual keyboard VK may represent that the user no longer has an intention to make the gesture.

As shown in FIG. 27A, the user may make a gesture of moving the left-hand finger pointer PK and the right-hand finger pointer PR out of the virtual keyboard VK.

As shown in FIG. 27B, when a gesture of moving each pointer outside the virtual keyboard VK is made, the display of the virtual keyboard VK may be released. Furthermore, the hovering pointer CR reflecting the user's gesture may be displayed. That is, in response to the user's gesture, a character input mode in which characters are input by using the virtual keyboard VK may be converted into a cursor mode allowing for selection using the hovering pointer CR.

FIGS. 28A through 31B are views illustrating the process of displaying a virtual keyboard in a mobile terminal according to another embodiment of this document.

As shown in the drawings, the controller 180 of a mobile terminal according to another embodiment of this document may enable conversion between the character input mode and the cursor mode according to a gesture made by a user. That is, the input mode may be changed only by an intuitive gesture without any additional manipulation.

As shown in FIGS. 28A through 28C, the user may make a gesture of spreading the five fingers FR of the hand H as shown in FIG. 28A, a gesture of unfolding only the index finger FR2 as shown in FIG. 28B, or a gesture of unfolding the five fingers FR of the hand H without spreading them as shown in FIG. 28C.

When the user makes the gesture as shown in FIG. 28A, the controller 180 may execute the character input mode enabling character input using the virtual keyboard VK.

When the finger gesture is changed from the gesture depicted in FIG. 28A into the gesture depicted in FIG. 28B or 28C, the controller 180 may convert the character input mode into the cursor mode enabling input using the hovering pointer CR.

In the cursor mode as shown in FIG. 28B, the hovering pointer CR moves along the tip of the index finger FR2, while in the cursor mode as shown in FIG. 28C, the hovering pointer CR moves along the tip of the middle finger FR3. That is, the hovering pointer CR may move along the very end of the hand H.

As shown in FIG. 29A, a memo application allowing for character input may be displayed on the display 151. An indicator IC that periodically blinks in order to indicate that it is waiting for character input from the user may be displayed in the memory application.

As shown in FIG. 29B, the user may make a gesture of unfolding only the index finger FR2 of the hand H. The gesture of unfolding only one finger may be understood as meaning that the user tries to enter the cursor mode to perform selection using the hovering pointer CR. That is, considering that a user's intention to instruct something is expressed through a gesture of unfolding the finger and pointing to a spot corresponding to the tip of the finger, performing the cursor mode in response to the gesture of unfolding the index finger FR2 may be considered to intuitively reflect the user's intention.

When a hovering gesture is made in a 3D space with the unfolded index finger FR, the controller 180 may move the hovering pointer CR on the display 151 in response to the hovering gesture. The user may perform operations, such as selecting a specific menu, and the like by using the hovering pointer CR.

As shown in FIG. 30A, the user may change a hand gesture from unfolding the index finger FR2 into unfolding the five fingers FR of the hand. The gesture of unfolding all the fingers FR may be similar to an operation of inputting characters using a keyboard. Thus, this gesture may be considered to reflect the user's intention to input characters.

When the user spreads all the fingers FR of the hand, the controller 180 may make the displayed hovering pointer CR disappear, and at the substantially the same time, the controller 180 may display a virtual keyboard VK on the display 151. That is, conversion from the cursor mode into the character input mode is carried out.

Pointers respectively corresponding to all the fingers FR may be displayed on the virtual keyboard VK. In this case, the pointers may vary in color, shape or the like in order to visually indicate each finger to which each pointer corresponds. For example, the pointers PR corresponding to the first finger (i.e., the thumb) to the fifth finger may be displayed in red, orange, yellow, green and blue, respectively.

Even when the input mode is converted into the cursor mode, the indicator IC may be displayed on the display 151, so that the user can intuitively recognize that an application that is currently being executed is an application enabling character input.

As shown in FIG. 30B, the user may input desired characters by using the virtual keyboard VK in the character input mode.

As shown in FIG. 31A, the user may change a hand gesture from a state where all the fingers FR are spread into a state where only the index finger FR2 is unfolded. This change of the hand gesture may be a reflection of the user's intention to convert from the character input mode into the cursor mode. When acquiring such an intention of the user, the controller 180 may make the displayed virtual keyboard VK disappear and substantially simultaneously display the hovering pointer CR. That is, the character input mode is converted into the cursor mode.

Since the conversion between the character input mode and the cursor mode can be performed by using a simple gesture of spreading or closing the fingers, an improvement in convenience in use can be expected.

As shown in FIG. 31B, the conversion between the character input mode and the cursor mode may be performed with all the fingers FR unfolded. That is, when a gesture of moving the hand H outside the VK region is made, the controller 180 may determine that the user will no longer perform the character input using the virtual keyboard VK. Accordingly, the controller 180 may convert the character input mode into the cursor mode and cause the virtual keyboard VK to disappear. In this case, the controller 180 may display the hovering pointer CR corresponding to the tip of the index finger FR2. That is, the location of the hovering pointer CR may be changed according to a movement of the tip of the index finger FR2.

Figure 33:
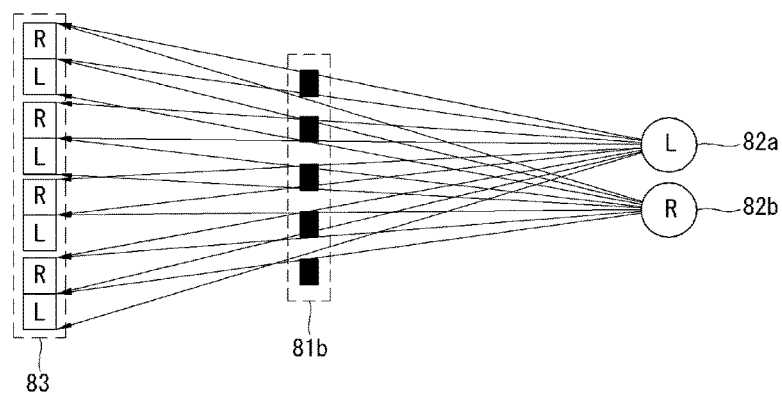

FIGS. 32 and 33 are views illustrating a method for displaying a stereoscopic image using binocular parallax according to an exemplary embodiment of the present invention. Specifically, FIG. 32 shows a scheme using a lenticular lens array, and FIG. 33 shows a scheme using a parallax barrier.

Binocular parallax (or stereo disparity) refers to the difference in vision of viewing an object between a human being's (user's or observer's) left and right eyes. When the user's brain combines an image viewed by the left eye and that viewed by the right eye, the combined image makes the user feel stereoscopic. Hereinafter, the phenomenon in which the user feels stereoscopic according to binocular parallax will be referred to as a 'stereoscopic vision' and an image causing a stereoscopic vision will be referred to as a 'stereoscopic image'. Also, when a particular object included in an image causes the stereoscopic vision, the corresponding object will be referred to as a 'stereoscopic object'.

A method for displaying a stereoscopic image according to binocular parallax is classified into a glass type method and a glassless type method. The glass type method may include a scheme using tinted glasses having a wavelength selectivity, a polarization glass scheme using a light blocking effect according to a deviation difference, and a time-division glass scheme alternately providing left and right images within a residual image time of eyes. Besides, the glass type method may further include a scheme in which filters each having a different transmittance are mounted on left and right eyes and a cubic effect with respect to a horizontal movement is obtained according to a time difference of a visual system made from the difference in transmittance.

The glassless type method, in which a cubic effect is generated from an image display surface, rather than from an observer, includes a parallax barrier scheme, a lenticular lens scheme, a microlens array scheme, and the like.

With reference to FIG. 32, in order to display a stereoscopic image, a display module 151 includes a lenticular lens array 81a. The lenticular lens array 81a is positioned between a display surface 81 on which pixels (L) to be input to a left eye 82a and pixels (R) to be input to a right eye 82b are alternately arranged along a horizontal direction, and the left and right eyes 82a and 82b, and provides an optical discrimination directionality with respect to the pixels (L) to be input to the left eye 82a and the pixels (R) to be input to the right eye 82b. Accordingly, an image which passes through the lenticular lens array 81a is separated by the left eye 82a and the right eye 82b and thusly observed, and the user's brain combines (or synthesizes) the image viewed by the left eye 82a and the image viewed by the right eye 82b, thus allowing the user to observe a stereoscopic image.

With reference to FIG. 33, in order to display a stereoscopic image, the display module 151 includes a parallax barrier 81b in the shape of a vertical lattice. The parallax barrier 81b is positioned between a display surface 81 on which pixels (L) to be input to a left eye 82a and pixels (R) to be input to a right eye 82b are alternately arranged along a horizontal direction, and the left and right eyes 82a and 82b, and allows images are separately observed at the left eye 82a and the right eye 82b. Accordingly, the user's brain combines (or synthesizes) the image viewed by the left eye 82a and the image viewed by the right eye 82b, thus allowing the user to observe a stereoscopic image. The parallax barrier 81b is turned on to separate incident vision only in the case of displaying a stereoscopic image, and when a planar image is intended to be displayed, the parallax barrier 81b may be turned off to allow the incident vision to pass therethrough without being separated.

Meanwhile, the foregoing methods for displaying a stereoscopic image are merely for explaining exemplary embodiments of the present invention, and the present invention is not meant to be limited thereto. Beside the foregoing methods, a stereoscopic image using binocular parallax may be displayed by using various other methods.

Figure 34:
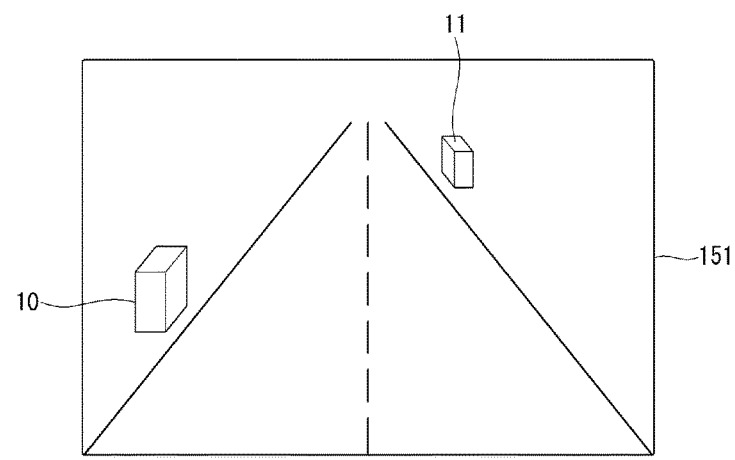
FIGS. 34 through 37 are views for explaining a method for displaying a stereoscopic image.

FIG. 34 illustrates an example of a stereoscopic image including a plurality of image objects 10 and 11.

For example, the stereoscopic image depicted in FIG. 34 may be an image obtained by the camera 121. The stereoscopic image includes a first image object 10 and a second image object 11. Here, it is assumed that there are two image objects 10 and 11 for ease of description; however, in actuality, more than two image objects may be included in the stereoscopic image.

The controller 180 may display an image acquired in real time by the camera 121 on the display 151 in the form of a preview.

The controller 180 may acquire one or more stereo disparities respectively corresponding to one or more of the image objects in operation 5110.

In the case where the camera 121 is a 3D camera capable of acquiring an image for the left eye (hereinafter, referred to as "a left-eye image") and an image for the right eye (hereinafter, referred to as "a right-eye image"), the controller 180 may use the acquired left-eye and right-eye images to acquire the stereo disparity of each of the first image object 10 and the second image 11.

Figure 35:
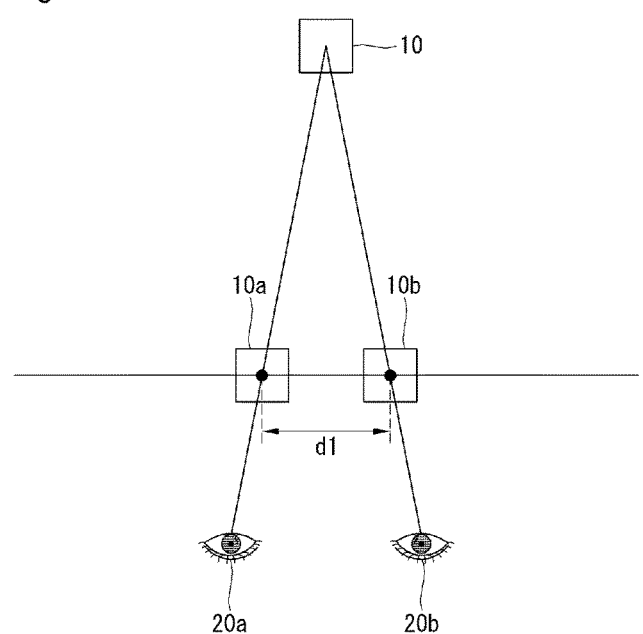

FIG. 35 is a view for explaining a stereo disparity of an image object included in a stereoscopic image.

For example, referring to FIG. 35, the first image object 10 may have a left-eye image 10a presented to the user's left eye 20a, and a right-eye image 10b presented to the right eye 20b.

The controller 180 may acquire a stereo disparity d1 corresponding to the first image object 10 on the basis of the left-eye image 10a and the right-eye image 10b.

In the case where the camera 121 is a 2D camera, the controller 180 may convert a 2D image, acquired by the camera 121, into a stereoscopic image by using a predetermined algorithm for converting a 2D image into a 3D image, and display the converted image on the display 151.

Furthermore, by using left-eye and right-eye images created by the above image conversion algorithm, the controller 180 may acquire the respective stereo disparities of the first image object 10 and the second image object 11.

Figure 36:
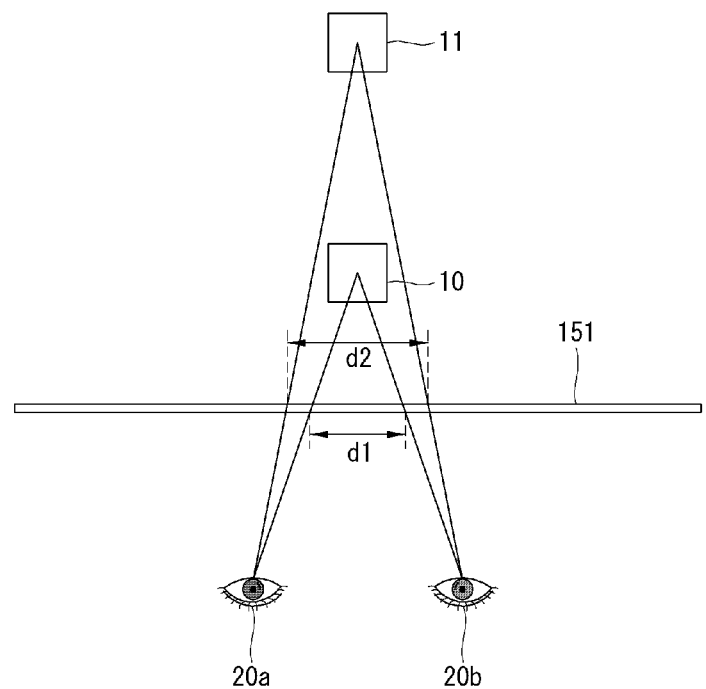

FIG. 36 is a view for comparing the stereo disparities of the image objects 10 and 11 depicted in FIG. 34.

Referring to FIG. 36, the stereo disparity d1 of the first image object 10 is different from a stereo disparity d2 of the second image object 11. Furthermore, as shown in FIG. 36, since the stereo disparity d2 of the second image object 11 is greater than the stereo disparity d1 of the first image object 10, the second image object 11 is viewed as if being located farther away from the user than the first image object 10.

The controller 180 may acquire one or more graphic objects respectively corresponding to one or more of the image objects in operation. The controller 180 may display the acquired one or more graphic objects on the display 151 so as to have a stereo disparity.

Figure 37:
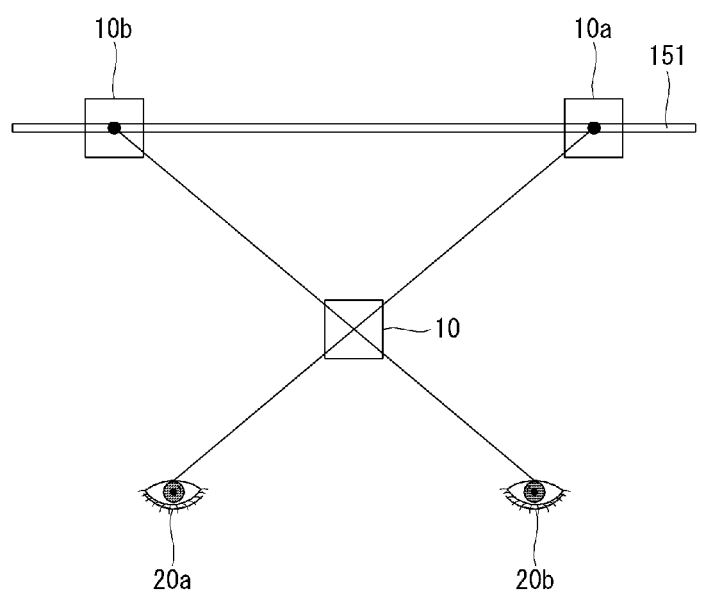

FIG. 37 illustrates the first image object 10 that may look as if protruding toward the user. As shown in FIG. 37, the locations of the left-eye image 10a and the right-eye image 10b on the display 151 may be opposite to those depicted in FIG. 35. When the left-eye image 10 and the right-eye image 10b are displayed in the opposite manner as above, the images are also presented to the left eye 20a and the right eye 20b in the opposite manner. Thus, the user can view the displayed image as if it is located in front of the display 151, that is, at the intersection of sights. That is, the user may perceive positive (+) depth in relation to the display 151. This is different from the case of FIG. 35 in which the user perceives negative (−) depth that gives the user an impression that the first image object 10 is displayed at the rear of the display 151.

The controller 180 may give the user the perception of various types of depth by displaying a stereoscopic image having positive (+) or negative depth (−) according to needs.

Figure 38:
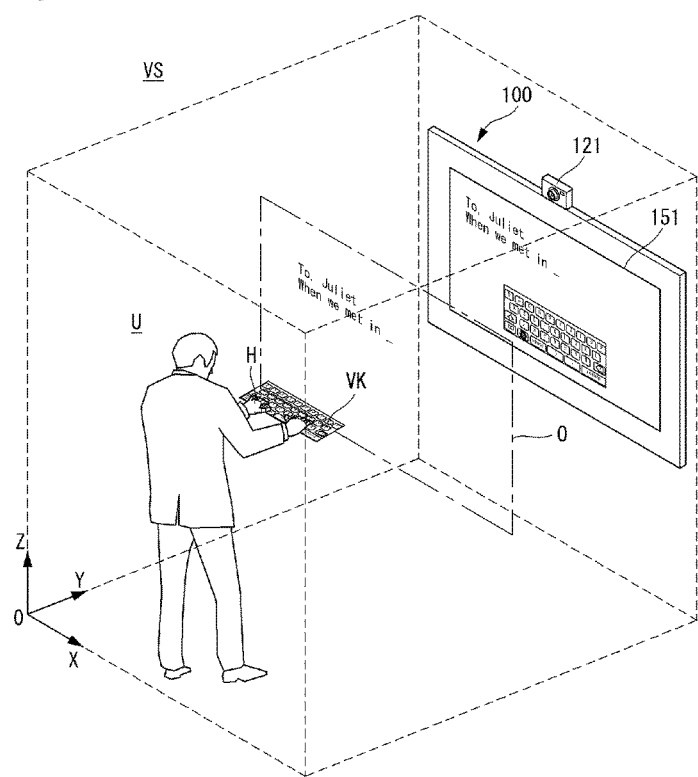
FIG. 38 is a view illustrating a virtual keyboard displayed in a virtual space according to another embodiment of this document.
Figure 39:
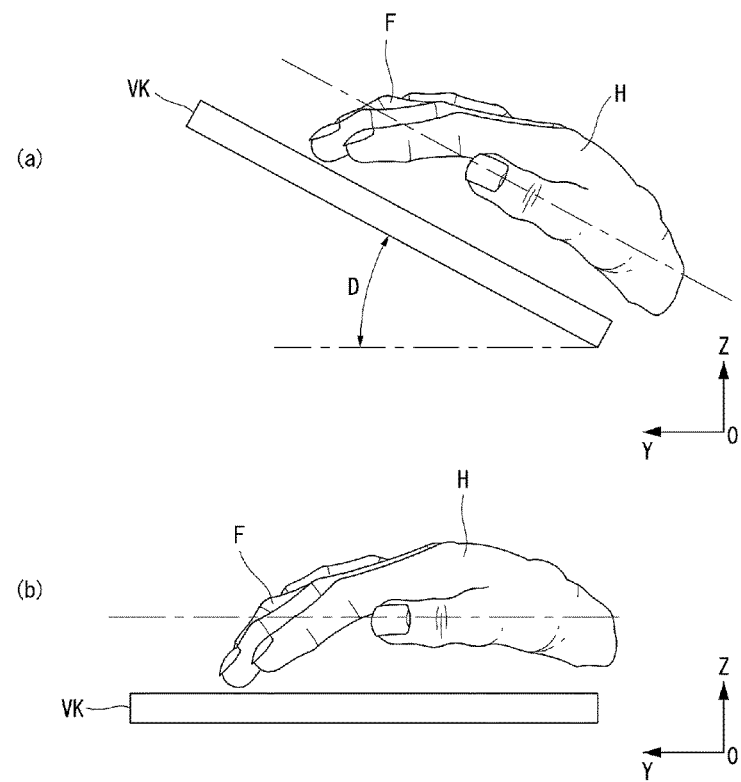
FIGS. 39 and 40 are views illustrating the positions of a virtual keyboard according to hand gestures and positions.
Figure 40:
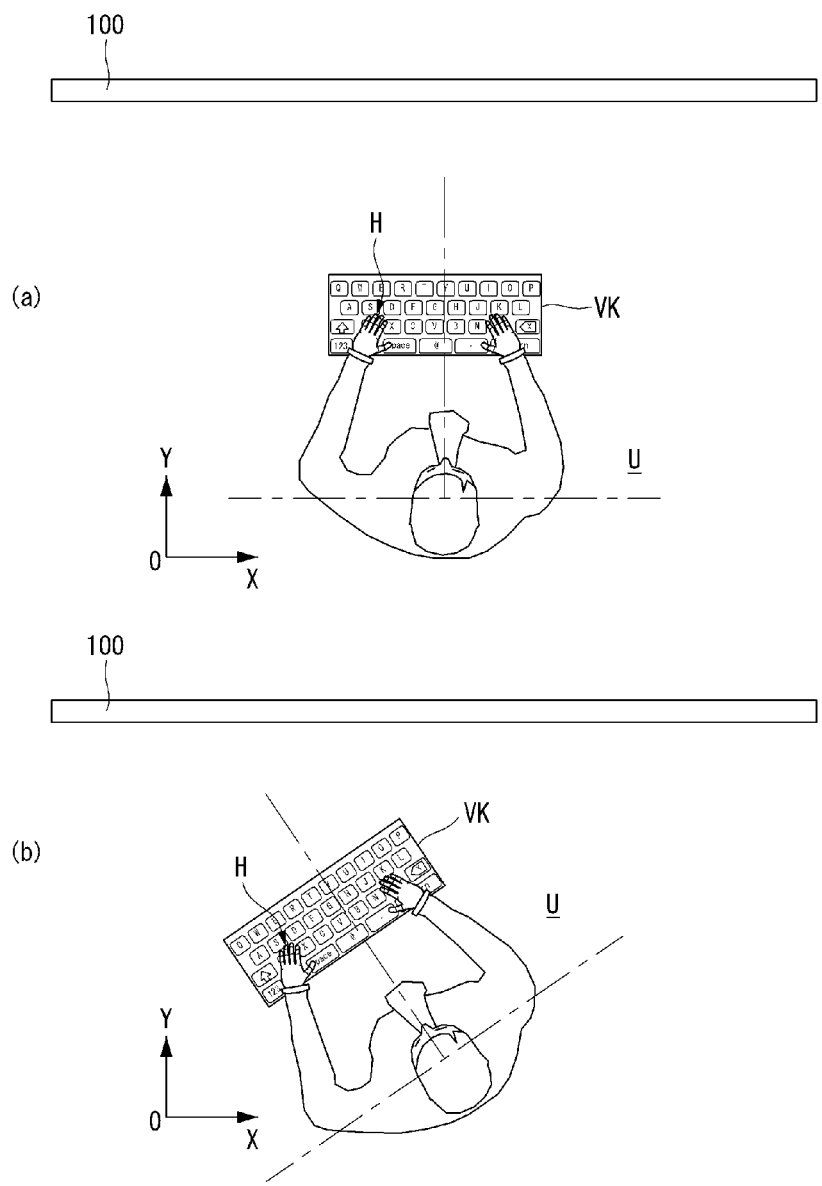

FIG. 38 is a view illustrating a virtual keyboard displayed in a virtual space according to another embodiment of this document.

As shown therein, the display device 100 according to another embodiment of this document may be displayed to have perspective in a 3D virtual space VS. That is, even though an image is displayed substantially on the display 151, the user U may have an impression that an image with positive or negative depth is displayed in the space. Since an image giving perception of depth is displayed in the 3D virtual space VS, the user may more naturally make a gesture of touching or grabbing a displayed image as if touching a real object.

The controller 180 may display the virtual keyboard VK adjacent to the hand H of the user. That is, the virtual keyboard VK corresponding to a position of the hand H may be displayed in the virtual space VS on the basis of a distance between the user U and the hand H, detected through the camera 121. When the virtual keyboard VK is displayed corresponding to the position of the hand H in the virtual space VS, the user U may visually and clearly recognize an arrangement of the keyboard corresponding to the current position of the hand H. Accordingly, the user can accurately make a character input gesture. For example, as shown in the drawing, when the user U writes an e-mail, the controller 180 may display in the virtual space Vs an e-mail image O and a virtual keyboard VK corresponding to the position of the hand H of the user U.

FIGS. 39A through 40B are views illustrating positions of a virtual keyboard according to gestures and positions of the hands.

As shown therein, the display device 100 according to another embodiment of this document may display in a virtual space VS a virtual keyboard VK corresponding to positions and angles of the hand(s) H and/or the finger(s).

As shown in FIG. 39A, the hand H and the fingers F may be at a predetermined angle with respect to an x-axial direction parallel to the ground. This means that the user is making a hand gesture for character input in the state where the wrist is slightly rotated clockwise. An angle between the angle of the hand H and the fingers F may be captured by the camera 121.

When the user makes a hand gesture for character input in the state where the wrist is slightly rotated, the controller 180 may display the virtual keyboard VK accordingly. This means that the virtual keyboard VK may be displayed in the virtual space VS to be inclined at an angle of D with respect to the x-axial direction. That is, the virtual keyboard VK is displayed corresponding to the angle of the hand, as well as the position of the hand H of the user U as described with reference to FIG. 38. Since the virtual keyboard VK is displayed in consideration of the position and angle of the hand H, the character input using the virtual keyboard VK can be more facilitated.

As shown in FIG. 39B, when the hand H and the fingers F are located parallel to the x-axial direction, the controller 180 may display the virtual keyboard VK accordingly. That is, the virtual keyboard VK may be displayed with its location controlled corresponding to the gesture of the hand H and the fingers F. The state of the virtual keyboard VK as shown in FIG. 39A and the state of the virtual keyboard VK as shown in FIG. 39B may be changed substantially in real time. Thus, the controller 180 may display a display state of the virtual keyboard VK on the basis of the positions, angles, and directions of the hand H and/or the fingers F being captured by the camera 121.

According to the angle of the hand H with respect to the x-axial direction, the controller 180 may change an angle of the virtual keyboard VK being displayed. Alternatively, the controller 180 may fix the angle of the virtual keyboard, once displayed, regardless of changes in angle.

As shown in FIG. 40A, the user U may input characters while facing the display device 100. That is, the hands H are placed in a y-axial direction with reference to the body. When the user's position is captured by the camera 121, the controller 180 may display the virtual keyboard VK corresponding to the user's posture.

As shown in FIG. 40B, the user U may input characters, inclined at a predetermined angle with respect to the display device 100. When it is determined that the user's position is inclined, the controller 180 may change the position of the virtual keyboard VK accordingly and then display the same.

Figure 41:
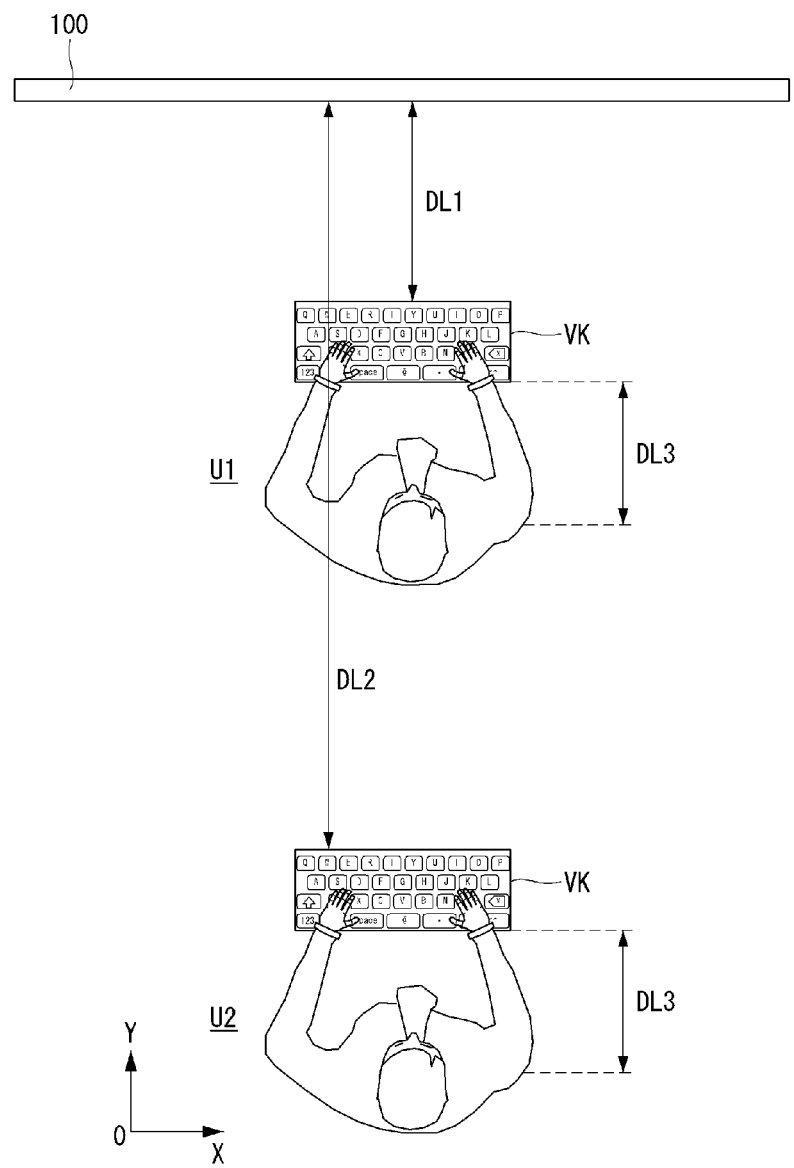
FIGS. 41 through 43 are views illustrating relationship between the display of a virtual keyboard and the distance to the display device.
Figure 42:
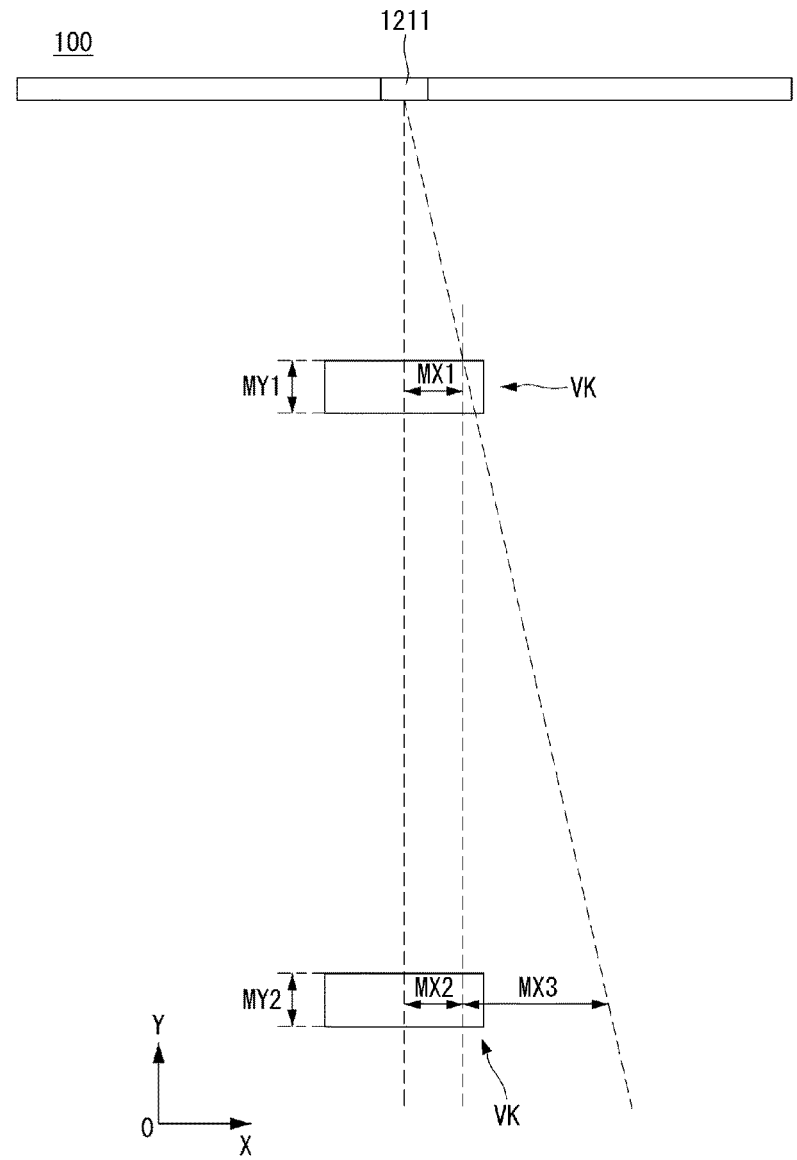
Figure 43:
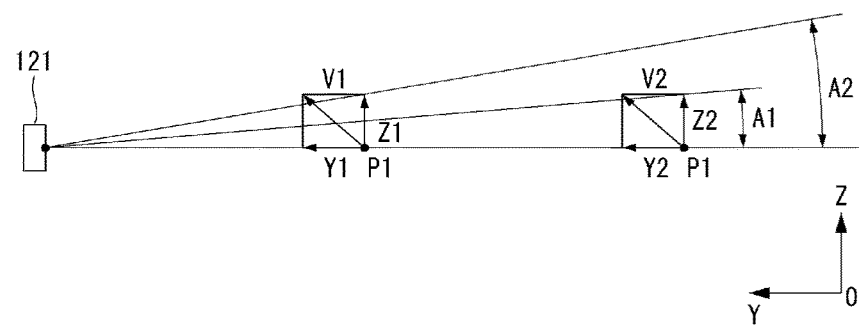

FIGS. 41 through 43 are views illustrating relationship between a distance to a display device and the display of a virtual keyboard.

As shown in the drawings, the controller 180 of the display device 100 according to another embodiment of this document may display a virtual keyboard VK in the virtual space VS depicted in FIG. 38, regardless of differences in distance to the display device 100 between users U1 and U2.

The users U1 and U2 may perform character input using gestures at various locations. For example, the first user U1 may input characters at a location closer to the display device 100 than the second user U2. That is, the first user U1 may be spaced apart from the display device at a first distance DL1, while the second user U2 may be spaced apart from the display device 100 at a second distance DL2. In this state, if the users U1 and U2 make hand gestures representing character input, the controller 180 may display virtual keyboards VK at locations corresponding to the locations of the users U1 and U2, respectively. In this case, the controller 180 may display the virtual keyboard VK at a location spaced apart from the body of each of the users U1 and U2 at a third distance DL, regardless of the first and second distances DL1 and DL2. That is, the controller 180 may display the virtual keyboard VK to have perspective giving an impression that the virtual keyboard VK is displayed at a location optimized for each of the users U1 and U2, regardless of the distance to the display device 100.

As shown in FIG. 42, a first virtual keyboard VK1 and a second virtual keyboard VK2 may be displayed at different locations with respect to the display device 100. In this case, the traces of gestures moving on the first virtual keyboard VK1 and the second virtual keyboard VK2 may be seem to be different due to their different distances to the camera 121. That is, first and second distances MY1 and MY2 in the y-axial direction parallel to the shooting direction of the camera 121 may be captured to be the same regardless of the distances to the camera 121. In contrast, third and fourth distances MX1 and MX2 in the x-axial direction which is not parallel to the shooting direction of the camera 121 may be captured differently according to the distances to the camera 121. For example, in an image captured by the camera 121, the third distance MX1 may appear to be longer than the fourth distance MX2 due to perspective. Accordingly, the controller 180 may allow the same result to be reflected when the user makes gestures moving the same distance, by considering the camera 121 and the position of each of the virtual keyboards VK1 and VK2 being displayed.

As shown in FIG. 43, the user may make a gesture at different distances from the camera 121. For example, the user may make gestures at the first and second positions P1 and P2.

The user may make gestures having traces as long as Y1 and Y2 in the y-axial direction at the first position P1 and the second position P2, respectively. Since the Y1 and Y2 are associated with gestures made parallel to the shooting direction of the camera 121, they may be captured as moving the same distance regardless of their distances to the camera 121. Accordingly, the moving distance in the y-axial direction does not require an additional calibration process upon a moving distance determined from the captured image.

The user may make gestures having traces as long as Z1 and Z2 in a z-axial direction at the first position P1 and the second position P2, respectively. Since the Z1 and Z2 are associated with gestures made in a direction perpendicular to the shooting direction of the camera 121, they may be captured as moving different distances according to their distances to the camera 121. For example, even if they move the same distance, the Z1 may be captured as moving a longer distance than the Z2. That is, an angle A1 of the trace at the first position P1, captured by the camera 121 may appear to be the same as an angle A2 of the trace at the second position P2. Accordingly, in the case of a gesture made in a direction which is not parallel to the shooting direction of the camera 121, the controller 180 may perform a calibration process upon the length of the trace of the gesture according to the distance to the camera 121. The calibration process upon the length of the gesture trace may make substantial gesture traces V1 and V2 the same regardless of the distances to the display device 100.

FIGS. 44 through 47 are views illustrating the process of displaying a virtual keyboard according to another embodiment of this disclosure.

As shown in the drawings, the display device 100 according to another embodiment of this document may varies how a virtual keyboard VK is displayed and appears according to a hand gesture.

As shown in FIG. 44, a user may make a gesture of moving the hand from the right side to the left side of a screen. When this gesture is captured, the controller 180 may display the virtual keyboard VK in a direction corresponding to the gesture. That is, the virtual keyboard VK may appear from the right side of the display so as to correspond to the direction of the hand gesture.

As shown in FIG. 45, the virtual keyboard VK may be displayed on the display 151 in response to the hand gesture of the user, and the user may input desired characters.

As shown in FIG. 46, the user may make a gesture of moving the hand from the left side to the right side of the display 151. When such a gesture is captured in the state where the virtual keyboard VK is displayed, the controller 180 may cause the virtual keyboard VK to move in the corresponding direction and then disappear. As shown in the drawings, since the virtual keyboard VK appears or disappears corresponding to the user's gesture, the intuitive manipulation of the virtual keyboard VK is enabled.

As shown in FIG. 47, the user U may make a gesture of moving the hand H up and down, right and left. When the camera 121 captures such a gesture of the user U, the controller 180 may display first to fourth virtual keyboards VK1 to VK4 corresponding to the captured gesture. For example, in the case of a hand gesture of moving the hand downwardly, the third virtual keyboard VK3 may be displayed from the upper side to the lower side.

The first to fourth virtual keyboards VK1 to VK4 may be virtual keyboards corresponding to different types of characters. For example, the first virtual keyboard VK1 may correspond to English uppercase characters, the second virtual keyboard VK2 may correspond to English lowercase characters, the third virtual keyboard VK3 may correspond to numeric characters, and the fourth virtual keyboard VK4 may correspond to Korean characters. The user may make a gesture facing the left side in order to input English uppercase characters, and a gesture facing downwards in order to input numeric characters. Accordingly, desired types of characters can be easily input without additional operation.

Figure 48:
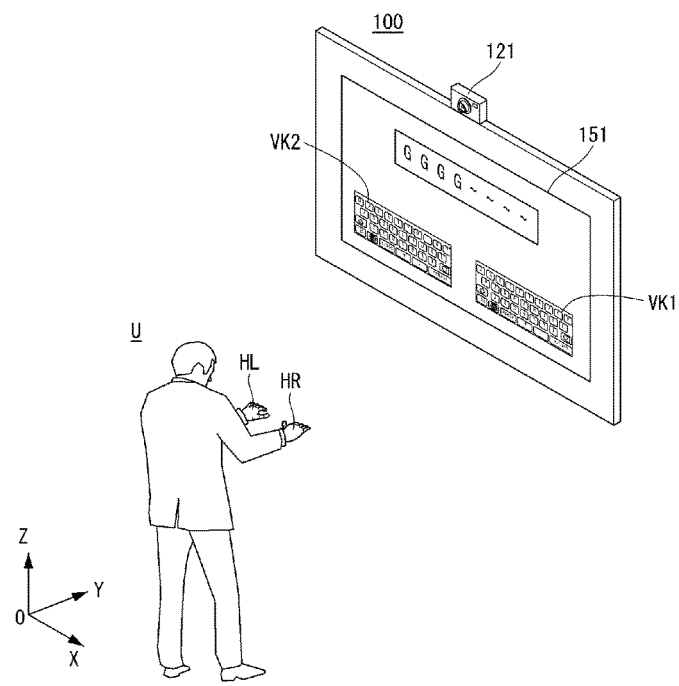
FIG. 48 is a view illustrating the display of a plurality of virtual keyboards according to another embodiment of this document.

FIG. 48 is a view illustrating the display of a plurality of virtual keyboards according to another embodiment of this document.

As shown therein, the display device 100 according to another embodiment of this document may allow for character input using the plurality of virtual keyboards VK1 and VK2

A user may make a gesture with the right hand HR and the left hand HL. The gesture made by the user may be captured through the camera 121. In this case, the input of characters may be performed at once without changing the display of a virtual keyboard corresponding to each type of characters.

The controller 180 may display on the display 151 a first virtual keyboard VK1 corresponding to the right hand HR, and a second virtual keyboard VK2 corresponding to the left hand HL. The first virtual keyboard VK1 may have an arrangement of English uppercase characters, and the second virtual keyboard VK2 may have an arrangement of special characters. Accordingly, the user may input English uppercase characters with the right hand HR and input special characters with the left hand HL without any additional gesture. Furthermore, FIG. 48 illustrates the case where two virtual keyboards are displayed. However, more virtual keyboards may be simultaneously displayed according to needs, so that desired characters can be input at once.

Figure 49:
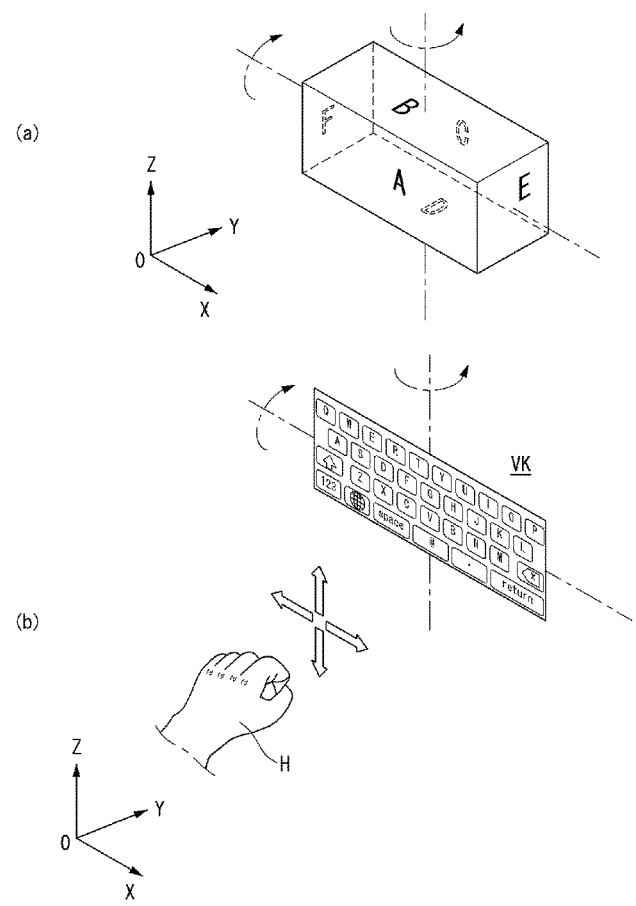
FIG. 49 is a view illustrating the process of activating and inactivating a virtual keyboard according to another embodiment of this document.

FIG. 49 is a view illustrating the process of activating and inactivating a virtual keyboard according to another embodiment of this document.

As shown therein, the controller 180 of the display device 100 according to another embodiment of this document may display a virtual keyboard VK on each face of a virtual polyhedral shape.

As shown in FIG. 49A, the controller 180 may display virtual keyboards on the respective faces of a hexahedron. For example, virtual keyboards VK corresponding to English uppercase characters, English lowercase characters, numeric characters, Korean characters, first special characters, and second special characters may be displayed on face A, face B, face C, face D, face E, and face F, respectively.

The hexahedron on which the virtual keyboards VK are displayed may rotate in response to the user's gesture. That is, the hexahedron may rotate about the y axis and/or the x axis.

As shown in FIG. 49B, when the hexahedron rotates, characters may be input by using a virtual keyboard VK displayed on the front face of the rotated hexahedron. For example, when the user makes a gesture facing downwards in the state where the virtual keyboard corresponding to English uppercase characters is currently being on the front face of the hexahedron, the hexahedron rotates so that the virtual keyboard corresponding to English lowercase characters may be displayed. Since a virtual keyboard VK corresponding to characters desired by the user is displayed in response to a hand gesture of the user, characters can be input in a more convenient manner.

While the present invention has been shown and described in connection with the exemplary embodiments, it will be apparent to those skilled in the art that modifications and variations can be made without departing from the spirit and scope of the invention as defined by the appended claims.

The invention claimed is:

1. A display device comprising:
  a display including a panel for displaying a stereoscopic image;
  a camera capturing a gesture in a three dimensional space; and
  a controller configured to cause the display to:
  display a virtual keyboard in an activated display state on the display, in response to a first gesture,
  change a display state of the virtual keyboard into a dimming display state in response to a second gesture, and
  change the display state of the virtual keyboard into an inactivated display state and terminate a display of the virtual keyboard in the inactivated display state in response to a third gesture.

2. The display device of claim 1, wherein the third gesture includes a predetermined time passing after the second gesture.

3. The display device of claim 1, wherein the controller displays the virtual keyboard corresponding to at least one of a position of a hand making the first gesture for character input, the number of hands, the number of unfolded fingers, and an angle of the hand with respect to a reference surface.

4. The display device of claim 1, wherein the controller displays at least one first pointer corresponding to at least one finger unfolded for character input on the virtual keyboard.

5. The display device of claim 4, wherein when a plurality of fingers are unfolded for the character input, the controller displays a plurality of first pointers, respectively corresponding to the plurality of fingers, to vary in at least one of color and shape.

6. The display device of claim 4, wherein the first gesture for the character input includes a gesture made with at least one finger unfolded for the character input, wherein, when the first gesture made with the at least one unfolded finger moves outside a region in which the virtual keyboard is displayed, the controller displays a second pointer corresponding to the first gesture of the at least one finger.

7. The display device of claim 6, wherein the controller causes the displayed virtual keyboard to disappear when the third gesture made with the at least one unfolded finger moves completely out of the region in which the virtual keyboard is displayed.

8. The display device of claim 1, wherein the dimming display state indicates the virtual keyboard is displayed in a semitransparent state.

9. The display device of claim 8, wherein the dimming display state indicates a state for waiting for character input.

10. The display device of claim 1, wherein the first gesture for character input is a gesture made with a plurality of spread fingers of a hand making the first gesture, wherein the controller causes the displayed virtual keyboard to disappear in the case of a first state in which only one finger of the hand is unfolded, a second state in which at least two of the plurality of fingers are in contact, or a third state in which at least one finger of the hand is folded.

11. A control method of a display device, the control method comprising:
  capturing a gesture of a user in a three dimensional space;
  displaying a virtual keyboard in an activated display state on the display, in response to a first gesture;
  changing a display state of the virtual keyboard into a dimming display state in response to a second gesture; and
  changing the display state of the virtual keyboard into an inactivated display state and terminating a display of the virtual keyboard in the inactivated display state in response to a third gesture.

12. The control method of claim 11, wherein the third gesture includes a predetermined time passing after the second gesture.

13. The control method of claim 11, further comprising displaying on the virtual keyboard at least one first pointer corresponding to at least one finger unfolded for character input.

14. The control method of claim 11, wherein the dimming display state indicates the virtual keyboard is displayed in a semitransparent state.

15. The control method of claim 11, further comprising, when a gesture of at least one finger unfolded for the character input moves outside a region of the virtual keyboard is displayed, displaying a second pointer corresponding to the gesture of the at least one finger.

16. The control method of claim 11, wherein, in the displaying of the virtual keyboard, the virtual keyboard is displayed so as to reflect an angle between a reference surface and a hand making the gesture.

* * * * *